United States Patent
Mortazavi et al.

(10) Patent No.: US 10,126,135 B2
(45) Date of Patent: Nov. 13, 2018

(54) TRAFFIC SIGNAL TIMING ESTIMATION USING AN ARTIFICIAL NEURAL NETWORK MODEL

(71) Applicant: NISSAN NORTH AMERICA, INC., Franklin, TN (US)

(72) Inventors: Ali Mortazavi, Walnut Creek, CA (US); Vikram Krishnamurthy, Marietta, GA (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/969,151

(22) Filed: Dec. 15, 2015

(65) Prior Publication Data
US 2017/0169705 A1  Jun. 15, 2017

(51) Int. Cl.
*G01C 21/34* (2006.01)
*H04L 29/08* (2006.01)
(Continued)

(52) U.S. Cl.
CPC ......... *G01C 21/34* (2013.01); *G08G 1/09675* (2013.01); *G08G 1/096716* (2013.01);
(Continued)

(58) Field of Classification Search
CPC .... G08G 1/0137; G01C 21/34; G05D 1/0088; G05D 1/021; H04L 67/12
See application file for complete search history.

(56) References Cited

U.S. PATENT DOCUMENTS 5,889,477 A * 3/1999 Fastenrath ........... G08G 1/0104
340/2.7
6,314,368 B1  11/2001 Gurmu et al.
(Continued)

FOREIGN PATENT DOCUMENTS

WO   WO 2015129366 A1 *  9/2015  ....... G08G 1/096827
WO   WO-2015129366 A1 *  9/2015  ....... G08G 1/096827

OTHER PUBLICATIONS

Wikipedia, Machine Learning, Dec. 2014, https://web.archive.org/web/20141208185048/https://en.wikipedia.org/wiki/Machine_learning.*
(Continued)

*Primary Examiner* — Aaron L Troost
(74) *Attorney, Agent, or Firm* — Young Basile Hanlon & MacFarlane, P.C.

(57) ABSTRACT

A method and apparatus for traffic signal timing estimation are disclosed. Traffic signal timing estimation may include a vehicle identifying transportation network information representing a vehicle transportation network including an intersection. The transportation network information may include expected traffic control device state information corresponding to the intersection, such as an artificial neural network based machine learning model trained for the intersection. The vehicle may identify a route through the vehicle transportation network that includes the intersection based on the expected traffic control device state information and may control the traversal of the vehicle transportation network by the vehicle based on the expected traffic control device state information to minimize one or more operational cost metrics. Training the model may include identifying training data from input data previously generated and stored by a traffic control device controller of the intersection.

25 Claims, 10 Drawing Sheets

(51) Int. Cl.
G08G 1/0967 (2006.01)
H04W 84/18 (2009.01)
H04W 84/00 (2009.01)

(52) U.S. Cl.
CPC . *G08G 1/096725* (2013.01); *G08G 1/096741* (2013.01); *G08G 1/096775* (2013.01); *G08G 1/096791* (2013.01); *H04L 67/12* (2013.01); *H04W 84/005* (2013.01); *H04W 84/18* (2013.01)

(56) References Cited

U.S. PATENT DOCUMENTS

| | | | |
|---|---|---|---|
| 6,502,033 | B1 | 12/2002 | Phuyal |
| 8,972,145 | B2 | 3/2015 | Mahler et al. |
| 2002/0026277 | A1 | 2/2002 | Kerner et al. |
| 2006/0009188 | A1* | 1/2006 | Kubota ............ G08G 1/096725 455/344 |
| 2006/0038704 | A1 | 2/2006 | Poltorak |
| 2010/0114472 | A1 | 5/2010 | Oumi |
| 2011/0037618 | A1* | 2/2011 | Ginsberg ......... G08G 1/096775 340/905 |
| 2011/0182475 | A1 | 7/2011 | Fairfield et al. |
| 2012/0139754 | A1 | 6/2012 | Ginsberg et al. |
| 2012/0274481 | A1 | 11/2012 | Ginsberg et al. |
| 2013/0096826 | A1* | 4/2013 | Krzanowski ....... G01C 21/3492 701/533 |
| 2013/0166109 | A1 | 6/2013 | Ginsberg |
| 2014/0277986 | A1* | 9/2014 | Mahler ................... G06F 7/00 701/93 |
| 2016/0214607 | A1 | 7/2016 | Dolgov et al. |
| 2016/0231746 | A1 | 8/2016 | Hazelton et al. |
| 2016/0288791 | A1 | 10/2016 | Park |
| 2016/0349066 | A1 | 12/2016 | Chung et al. |
| 2017/0010613 | A1* | 1/2017 | Fukumoto ........ G08G 1/096827 |

OTHER PUBLICATIONS

Buckholz, Traffic Signal Phasing, Mar. 2015, http://web.archive.Org/web/20150321084101/http://nacto.org/docs/usdg/traffic_signal_phasing_buckholz.pdf.*

Wikipedia, Feature Scaling, Oct. 2014, http://web.archive.org/web/20141012184320/http://en.wikipedia.org/wiki/Feature_scaling.*

Koukoumidis et al., "SignalGuru: Leveraging Mobile Phones for Collaborative Traffic Signal Schedule Advisory", MobiSys '11, Jun. 28-Jul. 1, 2011; Proceedings of the 9th International Conference on Mobile Systems, Applications, and Services, pp. 127-140.

Protschky, Valentin, et al.; "Adaptive Traffic Light Prediction Via Kalman Filtering", IEEE Intelligent Vehicles Symposium (IV), Jun. 8, 2014, Dearborn, Michigan, USA, 7 pp.

Seredynski, Marcin, et al.; "Comparison of Green Light Optimal Speed Advisory Approaches", Proceedings of the 16th International IEEE Annual Conference on Intelligent Transportation Systems (ITSC 2013), The Hague, The Netherlands, Oct. 6, 2013, 6 pp.

Bodenheimer, Robert, et al.; "Enabling GLOSA for Adaptive Traffic Lights", 2014 IEEE Vehicular Networking Conference (VNC), 8 pp.

Barthauer, Mirko, et al.; "Evaluation of a signal state prediction algorithm for car to infrastructure applications", www.sciencedirect.com; Transportation Research Procedia 3 (2014) pp. 982-991, 10 pp.

Koukoumidis, Emmanouil, et al.; "Leveraging Smartphone Cameras for Collaborative Road Advisories", IEEE Transactions on Mobile Computing, vol. 11, No. 5, May 2012, 17 pp.

Katsaros, Konstantinos, et al.; "Performance study of a Green Light Optimized Speed Advisory (GLOSA) Application Using an Integrated Cooperative ITS Simulation Platform", 2011 IEEE, pp. 918-923, 6 pp.

Van Katwijk, R.T.; "Multi-Agent Look-Ahead Traffic-Adaptive Control", TRAIL Thesis Series T2008/3, The Netherlands Trail Research School, ISBN 978-90-5584-098-4, 2008, 173 pp.

Protschky, Valentin, et al.; "Extensive Traffic Light Prediction Under Real-World Conditions", 2014 IEEE, 5 pp.

* cited by examiner

TRAFFIC SIGNAL TIMING ESTIMATION USING AN ARTIFICIAL NEURAL NETWORK MODEL

TECHNICAL FIELD

This disclosure relates to vehicle routing and navigation.

BACKGROUND

A vehicle, such as an autonomous vehicle, may traverse a route of travel from an origin to a destination. The vehicle may include a control system that may generate and maintain the route of travel and may control the vehicle to traverse the route of travel. Accordingly, a method and apparatus for traffic signal timing estimation using an artificial neural network model may be advantageous.

SUMMARY

Disclosed herein are aspects, features, elements, implementations, and embodiments of traffic signal timing estimation using an artificial neural network model.

An aspect of the disclosed embodiments is a vehicle for traffic signal timing estimation using an artificial neural network model. The vehicle may include a processor configured to execute instructions stored on a non-transitory computer readable medium to identify transportation network information representing a vehicle transportation network, the vehicle transportation network including a primary destination, wherein identifying the transportation network information includes identifying the transportation network information such that the transportation network information includes expected traffic control device state information, wherein the expected traffic control device state information is determined using an expected traffic control device state determination unit, wherein the expected traffic control device state determination unit implements a machine learning algorithm, wherein the machine learning algorithm includes an artificial neural network algorithm. The processor may be configured to execute instructions stored on the non-transitory computer readable medium to identify a route from an origin to the primary destination in the vehicle transportation network using the transportation network information, wherein the route includes a vehicle transportation network intersection, and wherein the expected traffic control device state information includes expected traffic control device state information corresponding to the vehicle transportation network intersection, and wherein using the transportation network information includes using the expected traffic control device state information corresponding to the vehicle transportation network intersection. The vehicle may include a trajectory controller configured to operate the vehicle to traverse the vehicle transportation network from the origin to the primary destination using the route.

Another aspect of the disclosed embodiments is a vehicle for traffic signal timing estimation using an artificial neural network model. The vehicle may include a processor configured to execute instructions stored on a non-transitory computer readable medium to identify transportation network information representing a vehicle transportation network, the vehicle transportation network including a primary destination, wherein identifying the transportation network information includes identifying the transportation network information such that the transportation network information includes expected traffic control device state information, wherein the expected traffic control device state information is determined using an expected traffic control device state determination unit, wherein the expected traffic control device state determination unit implements a machine learning algorithm, wherein the machine learning algorithm includes an artificial neural network algorithm. The processor may be configured to execute instructions stored on the non-transitory computer readable medium to identify a route from an origin to the primary destination in the vehicle transportation network using the transportation network information, wherein the route includes a vehicle transportation network intersection, and wherein the expected traffic control device state information includes expected traffic control device state information corresponding to the vehicle transportation network intersection, and wherein using the transportation network information includes using the expected traffic control device state information corresponding to the vehicle transportation network intersection. The vehicle may include a trajectory controller configured to operate the autonomous vehicle to traverse the vehicle transportation network from the origin to the primary destination using the route using the expected traffic control device state information corresponding to the vehicle transportation network intersection.

Another aspect of the disclosed embodiments is a vehicle for traffic signal timing estimation using an artificial neural network model. The vehicle may include a processor configured to execute instructions stored on a non-transitory computer readable medium to identify transportation network information representing a vehicle transportation network, the vehicle transportation network including a primary destination, wherein identifying the transportation network information includes identifying the transportation network information such that the transportation network information includes expected traffic control device state information, wherein the expected traffic control device state information is determined using an artificial neural network algorithm. The vehicle may identify the expected traffic control device state information such that the expected traffic control device state information is determined by receiving traffic control information for a vehicle actuated traffic control device controller associated with the vehicle transportation network intersection, evaluating the traffic control information to identify a plurality of candidate traffic control features, determining a plurality of selected traffic control features from the plurality of candidate traffic control features, and training the expected traffic control device state determination unit corresponding to the vehicle transportation network intersection using the plurality of selected traffic control features. The processor may be configured to execute instructions stored on the non-transitory computer readable medium to identify a route from an origin to the primary destination in the vehicle transportation network using the transportation network information, wherein the route includes a vehicle transportation network intersection, and wherein the expected traffic control device state information includes expected traffic control device state information corresponding to the vehicle transportation network intersection, and wherein using the transportation network information includes using the expected traffic control device state information corresponding to the vehicle transportation network intersection, wherein the expected traffic control device state information includes expected permitted right-of-way signal temporal information corresponding to the vehicle transportation network intersection for the route. The vehicle may include a trajectory controller configured to operate the vehicle to traverse the vehicle transportation network from the origin to the primary destination using the route.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
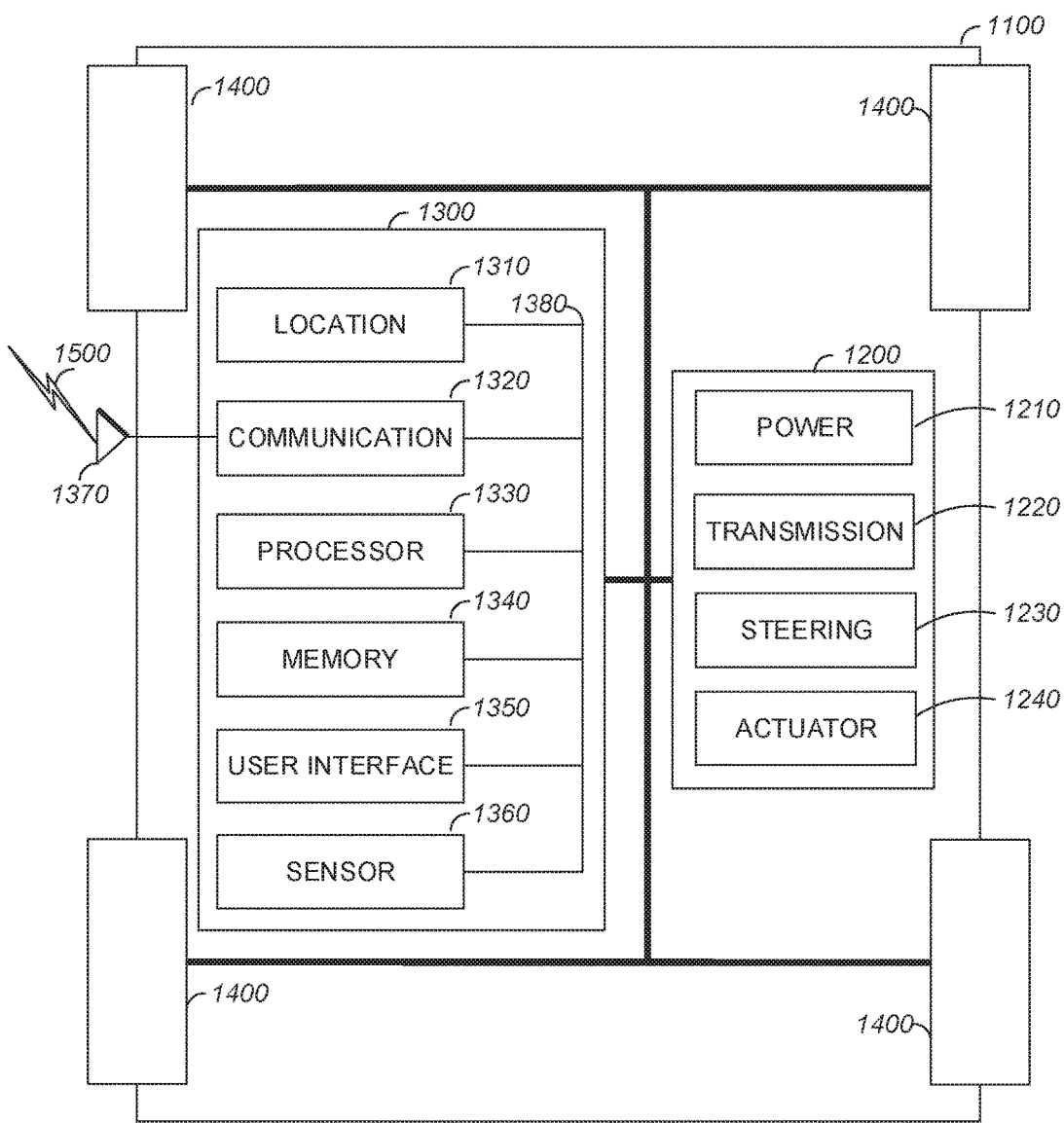
FIG. 1 is a diagram of an example of a portion of a vehicle in which the aspects, features, and elements disclosed herein may be implemented.

A vehicle, such as an autonomous vehicle, may travel from a point of origin to a destination in a vehicle transportation network. For example, an autonomous vehicle may traverse the vehicle transportation network without human intervention. The vehicle may include a controller, which may perform vehicle routing and navigation. The controller may generate a route of travel from the origin to the destination based on vehicle information, environment information, vehicle transportation network information representing the vehicle transportation network, or a combination thereof. In an autonomous vehicle, the controller may output the route of travel to a trajectory controller that may operate the vehicle to travel from the origin to the destination using the generated route.

In some embodiments, the vehicle transportation network information may include expected traffic control device state information, such as a machine learning model, which may be an artificial neural network model or a support vector regression model, which may be used by the vehicle to determine an expected signal state of a traffic control device for an intersection in the vehicle transportation network along a route of traversal of the vehicle.

In some embodiments, the model may be trained for a respective intersection based on training data corresponding to the intersection. In some embodiments, the training data may be generated based on previously stored data indicating intersection conditions and intersection control device state information generated and stored during one or more previous time periods. In some embodiments, training the model may include evaluating the input data generated and stored by the traffic control device to identify one or more relevant features, extracting the features and corresponding values from the input data, validating the extracted data, normalizing the validated data, temporally grouping the normalized data, and training the model per temporal group using the normalized data groups.

In some embodiments, the vehicle may determine a route from an origin to a destination based on the trained model. For example, the vehicle may identifying an intersection in a candidate route, may determine an expected time for the vehicle to reach the intersection using the route, may determine expected traffic conditions corresponding to the expected time for the vehicle to arrive at the intersection, may determine a corresponding expected signal state using the trained model, and may select or adjust the route based on the expected signal state. In another example, the vehicle may adjust a speed of the vehicle in response to an expected signal state. For example, the vehicle may slightly increase or reduce speed to arrive at the intersection during a permitted right-of-way signal, so as to avoid stopping at a denied right-of way signal for the intersection.

The embodiments of the methods disclosed herein, or any part or parts thereof, including and aspects, features, elements thereof, may be implemented in a computer program, software, or firmware, or a portion thereof, incorporated in a tangible non-transitory computer-readable or computer-usable storage medium for execution by special purpose computer or processor.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle, such as an autonomous vehicle, in which the aspects, features, and elements disclosed herein may be implemented. In some embodiments, a vehicle 1000 may include a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1400 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the control unit 1300 the actuator 1240 or both. The steering unit 1230 may be controlled by the control unit 1300 the actuator 1240 or both and may control the wheels 1400 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more general purpose processors, one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless medium 1500, such as via the communication interface 1370. Although not explicitly shown in FIG. 1, the communication unit 1320 may be configured to transmit, receive, or both via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used. In some embodiments, the communication unit 1320 may include a dedicated short range communications (DSRC) unit, a wireless safety unit (WSU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a speaker, a microphone, a haptic display, a feature tracking device, such as an eye-tracking device, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch based communication with the person. In some embodiments, the user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000 and a rout planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
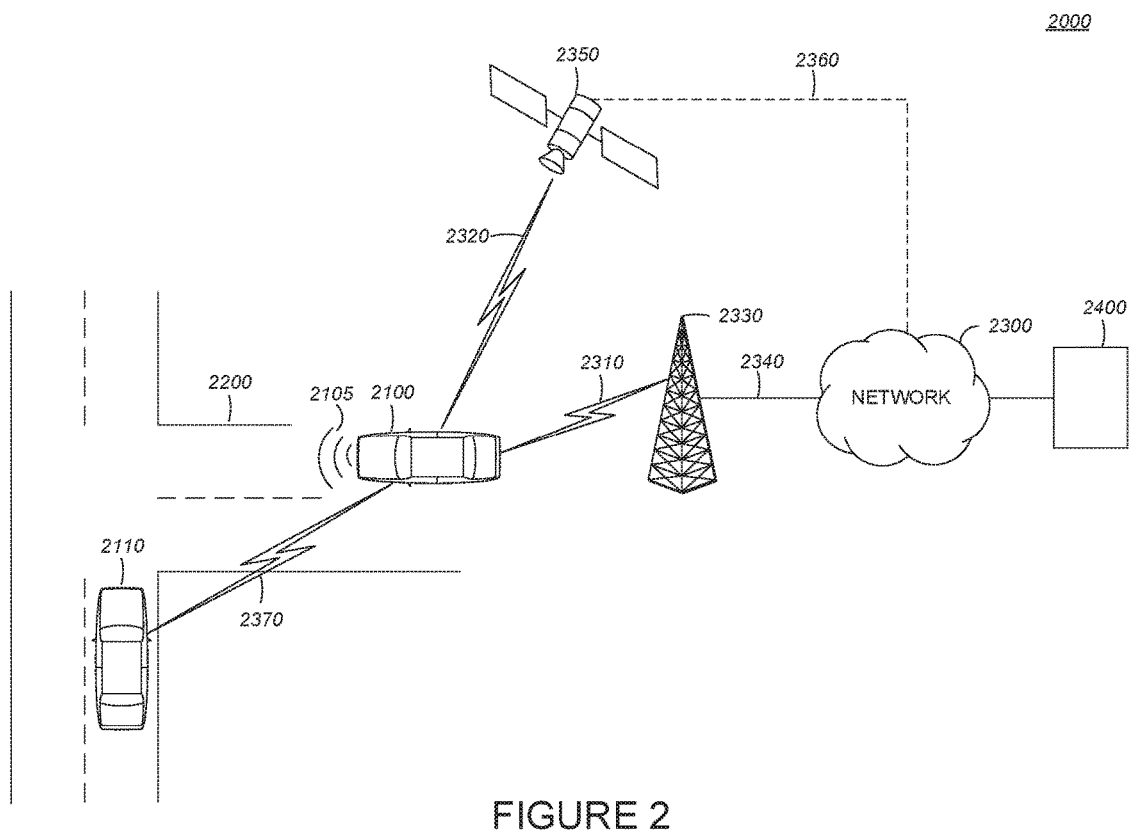
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, a vehicle 2100/2110 may communicate with another vehicle 2100/2110. For example, a host, or subject, vehicle (HV) 2100 may receive one or more automated inter-vehicle messages, such as a basic safety message, from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). In some embodiments, a vehicle 2100/2110 may transmit one or more automated inter-vehicle messages periodically, such as based on a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmitting vehicle is in a neutral state, a parked state, a forward state, or a reverse state.

In some embodiments, a vehicle 2100 may communicate with the communications network 2300 via an access point 2330. An access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements. Although not shown separately in FIG. 2, in some embodiments, a vehicle 2100/2110 may communicate with an element of the vehicle transportation network, such as an infrastructure device, via a direct communication link, which may be similar to the direct communication link 2370 shown in FIG. 2. For example, an infrastructure element of the vehicle transportation network may include a communication device, such as communication device 2400, and a vehicle 2100/2110 may communicate with the infrastructure device via a direct communication link, such as a Dedicated Short Range Communication (DSRC) protocol link, or any other direct communication link.

In some embodiments, the vehicle 2100 may communicate with the communications network 2300 via a satellite 2350, or other non-terrestrial communication device. A satellite 2350, which may include a computing device, may be configured to communicate with a vehicle 2100, with a communication network 2300, with one or more communication devices 2400, or with a combination thereof via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, a vehicle 2100 may identify a portion or condition of the vehicle transportation network 2200. For example, the vehicle may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, a vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows one vehicle 2100, one vehicle transportation network 2200, one electronic communication network 2300, and one communication device 2400, any number of vehicles, networks, or computing devices may be used. In some embodiments, the vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

FIGS. 3-6 show examples of portions of a vehicle transportation network. For simplicity and clarity, unless otherwise specified, the vehicle transportation network portions are shown oriented with North at the top and East at the right.

Figure 3:
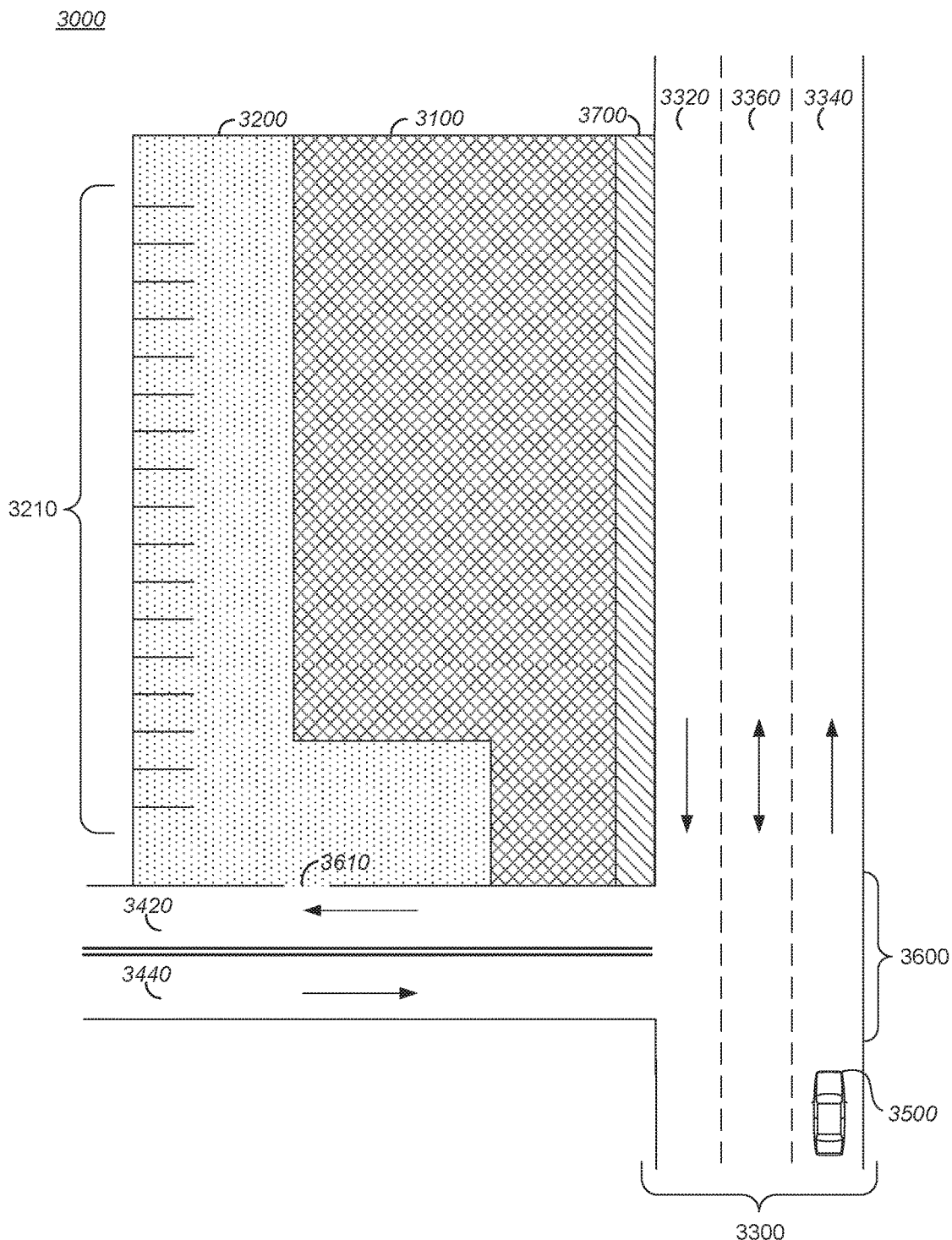
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, a vehicle 3500, such as the vehicle 1000 shown in FIG. 1 or the vehicle 2100 shown in FIG. 2, which may be an autonomous vehicle, may traverse a portion or portions of the vehicle transportation network 3000. In some embodiments, the parking area 3200 may include parking slots 3210.

A portion of the vehicle transportation network, such as a road 3300/3400 may include one or more lanes 3320/3340/3360/3420/3440, and may be associated with one or more directions of travel, which are indicated by arrows in FIG. 3.

The vehicle transportation network may include one or more intersections 3600 or interchanges 3610 between one or more navigable, or partially navigable, areas 3200/3300/3400. For example, the portion of the vehicle transportation network shown in FIG. 3 includes an intersection 3600 between the road 3300 and the road 3400. In another example, the portion of the vehicle transportation network shown in FIG. 3 includes an interchange 3610 between the parking area 3200 and road 3400. Although not shown in FIG. 3, an intersection 3600 or interchange 3610 may include a traffic control device, such as a traffic light.

In some embodiments, a vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, the Figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

In some embodiments, the vehicle transportation network may be associated with, or may include, a pedestrian transportation network. For example, FIG. 3 includes a portion 3700 of a pedestrian transportation network, which may be a pedestrian walkway. In some embodiments, a pedestrian transportation network, or a portion thereof, such as the portion 3700 of the pedestrian transportation network shown in FIG. 3, may be represented as pedestrian transportation network information. In some embodiments, the vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 3, a pedestrian navigable area, such as a pedestrian crosswalk, may correspond with a navigable area, or a partially navigable area, of a vehicle transportation network.

Figure 4:
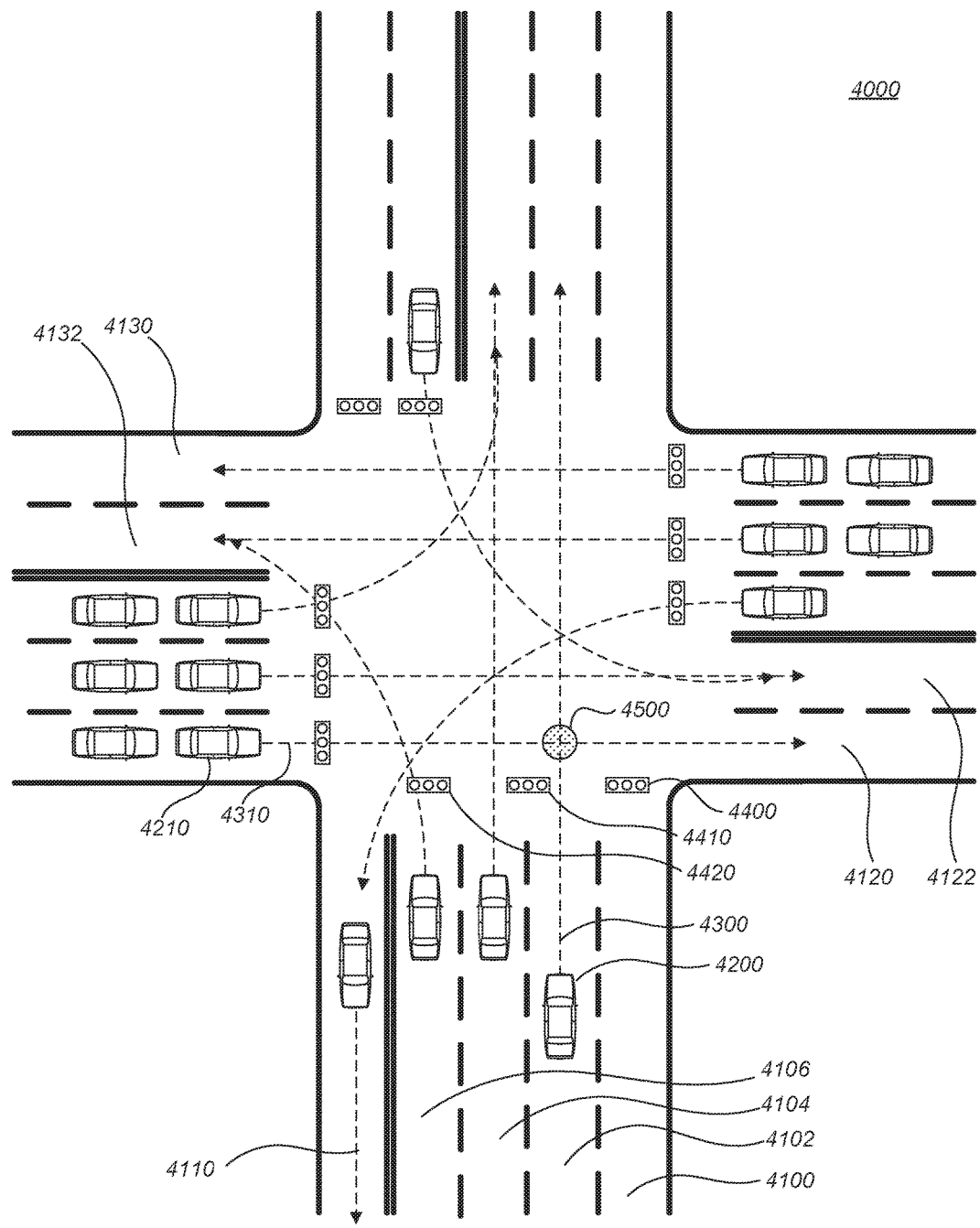
FIG. 4 is a diagram of a portion of a vehicle transportation network including an intersection in accordance with this disclosure.

FIG. 4 is a diagram of a portion of a vehicle transportation network including an intersection 4000 in accordance with this disclosure. A vehicle transportation network intersection 4000 may include one or more roads, each of which may include one or more lanes 4100/4102/4104/4106/4110/4120/4122/4130/4132. One or more vehicles 4200/4210 may traverse the vehicle transportation network via the intersection 4000. In FIG. 4, expected paths 4300/4310 for respective vehicles are shown using directed broken lines.

In some embodiments, the flow of vehicles 4200/4210 through an intersection 4000 may be directed by one or more traffic control devices 4400/4410/4420, such as one or more traffic lights or pedestrian signals. The traffic control devices 4400/4410/4420 of an intersection may be controlled by one or more traffic control device controllers (not shown). In some embodiments, a portion of a lane, or lanes, which may include vehicle lanes, pedestrian lanes, or both, leading into an intersection 4000 may be identified as an approach. In some embodiments, the flow of vehicles 4200/4210 through an intersection 4000 via an approach, or group of approaches, may be directed by a corresponding traffic control device 4400/4410/4420. A movement may represent a traversal of an expected, or permitted, path through the intersection by a vehicle in a lane. Although not shown in FIG. 4, in some embodiments, an intersection may include one or more non-vehicle approaches, such as pedestrian approaches.

In some embodiments, the approaches directed by a traffic control device 4400/4410/4420 may be identified as a signal group. For example, in FIG. 4, the rightmost northbound lane 4100 may be directed by traffic control device 4400, the next the rightmost northbound lanes 4102/4104 may be a signal group and may be directed by traffic control device 4410, and the leftmost northbound lane 4106 may be directed by traffic control device 4420. In some embodiments, each signal group may be associated with an identifier or label.

In some embodiments, the traffic control device controller may direct traffic through the intersection using one or more phases or blocks. A phase, or block, may include an allocation of permitted right-of-way direction, such as a green signal or a walk signal, to one or more signal groups, or movements, concurrently. A green phase, or block, may represent one or more signal groups concurrently having a proceed, or permitted, rite-of-way indicator, such as a green signal or a walk signal. A red phase, or block, may represent one or more signal groups concurrently having a do-not-proceed or denied rite-of-way indicator, such as a red signal or a stop signal.

In some embodiments, phases may be scheduled to minimize or eliminate inter-signal group conflicts. An inter-signal group conflict may indicate that the expected path for vehicles, or pedestrians, in a lane or approach of a signal group overlaps with the movement of a lane or approach of another signal group of the vehicle transportation network intersection 4000. The geographic location of the overlap of the expected paths 4300/4310 of a conflict may be identified as the conflict area 4500. For example, the expected path 4300 of the vehicle 4200 shown at the lower right conflicts with the expected path 4310 of the vehicle 4210 shown at the center left at the conflict area 4500. In some embodiments, a green phase may include one or more conflicting movements. For example, the expected path of a pedestrian crossing a lane may conflict with the expected path of a vehicle turning onto the lane, and a phase may include signal groups including the pedestrian path and the vehicle path. A conflicting expected path in a green phase may be a permitted expected path, or permitted movement, and a non-conflicting movement in a green phase may be a protected movement.

In some embodiments, a cycle may include a green phase corresponding to each of the signal groups of an intersection, and the cycle time may be the sum of the period or duration of the phases of the cycle. The signal cycle for a signal group may indicate the sum of the period or duration of each possible state, such as proceed or green, proceed with caution or yellow, do-not-proceed or red, of the signal group. An interval may indicate the duration or period of each respective signal state for a signal group. Each interval may be associated with a respective defined minimum duration, defined maximum duration, or both. In some embodiments, a yellow, or warning, phase may be included. The yellow phase may be a defined duration, such as four or five seconds.

In some embodiments, the control of the traffic control devices for an intersection may be based on one or more defined schedules and may omit using current traffic state information. In some embodiments, the control of the traffic control devices for an intersection may be based on vehicle actuation. For example, the traffic control device controller may receive information indicating a current traffic state, such as the arrival of a vehicle in an approach to the intersection, and may adjust the phases of the intersection based on the current traffic information. For example, the intersection may include one or more vehicle detection devices, or loops, corresponding to one or more approaches to the intersection, which may detect vehicles geographically located within the respective approach. In some embodiments, an approach may include multiple detection devices. In some embodiments, vehicle-actuated control may determine whether to extend, or continue, a current phase based on the traffic state of approaches corresponding to the current green phase and may omit using current traffic state information corresponding to other approaches. In some embodiments, adaptive control may determine whether to extend, or continue, a current phase based on the traffic state of approaches corresponding to the current green phase, the other approaches, or a combination thereof.

Figure 5:
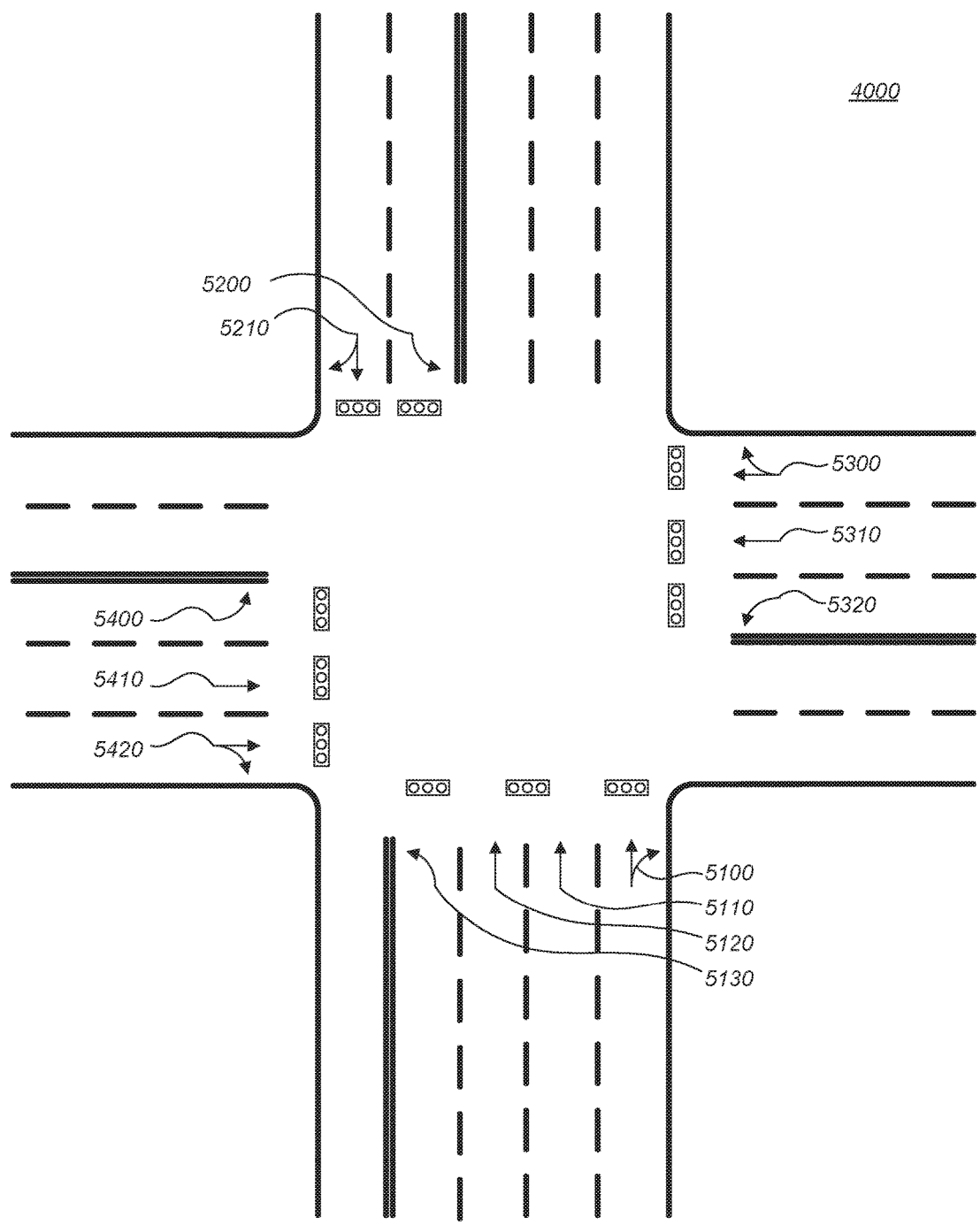
FIG. 5 is another diagram of a portion of a vehicle transportation network including an intersection in accordance with this disclosure.

FIG. 5 is another diagram of the portion of the vehicle transportation network intersection 4000 shown in FIG. 4 in accordance with this disclosure. As shown in FIG. 5, a vehicle transportation network intersection may include multiple movements. For example, vehicles in the right-most northbound lane may precede strait across the intersection 4000 or may turn right through the intersection 4000, as shown at 5100. Vehicles in the two center northbound lanes may precede strait across the intersection 4000 as shown at 5110 and 5120. Vehicles in the left-most northbound lane may turn left through the intersection 4000 as shown at 5130. Vehicles in the right southbound lane may turn left through the intersection 4000 as shown at 5200. Vehicles in the left southbound lane may precede strait across the intersection 4000 or may turn right through the intersection 4000 as shown at 5210. Vehicles in the top westbound lane may precede strait across the intersection 4000 or may turn right through the intersection 4000 as shown at 5300. Vehicles in the center westbound lane may precede strait across the intersection 4000 as shown at 5310. Vehicles in the bottom westbound lane may turn left through the intersection 4000 as shown at 5320. Vehicles in the top eastbound lane may turn left through the intersection 4000 as shown at 5400. Vehicles in the center eastbound lane may precede strait across the intersection 4000 as shown at 5410. Vehicles in the bottom eastbound lane may precede strait across the intersection 4000 or may turn right through the intersection 4000 as shown at 5420.

One or more of the movements 5100-5420 may be included in a phase or block. For example, a cycle for the intersection 4000 may include four phases. A first phase may include the right-most northbound movement 5100, which may include the northbound right turn, the center northbound movements 5110 and 5120, and the southbound straight and right turn movement 5210. A second phase may include the northbound left turn 5130 and southbound left turn 5200. A third phase may include the top westbound movement 5300, the center westbound movement 5310, the center eastbound movement 5410, and the bottom eastbound movement 5420. A fourth phase may include the bottom westbound movement 5320 and the top eastbound movement 5400.

Figure 6:
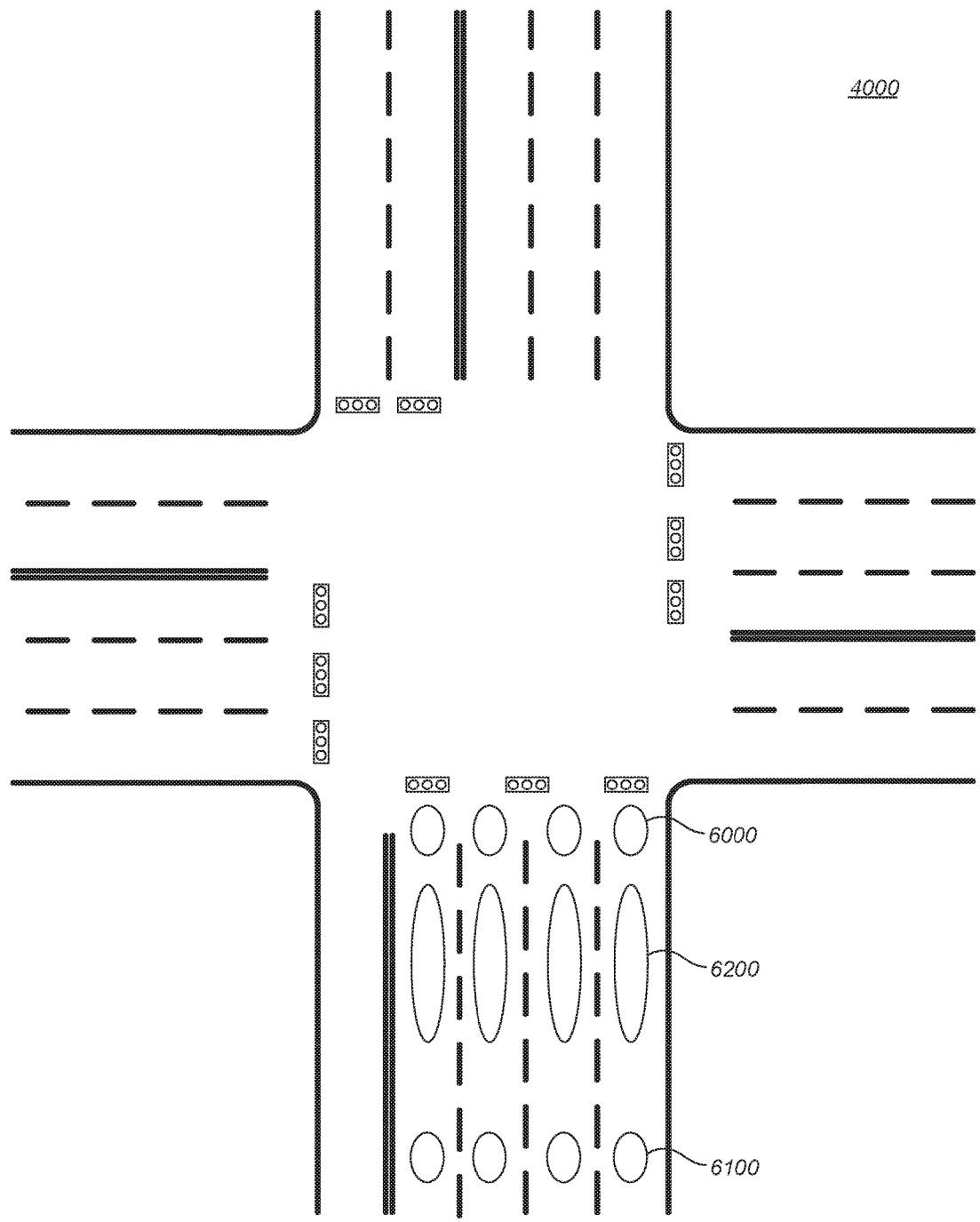
FIG. 6 is another diagram of a portion of a vehicle transportation network including an intersection in accordance with this disclosure.

FIG. 6 is another diagram of the portion of the vehicle transportation network intersection 4000 shown in FIG. 4 in accordance with this disclosure. As shown in FIG. 6, a vehicle transportation network intersection may include one or more detectors 6000/6100/6200, or detection loops. A detector may include any infrastructure device, or combination of devices, capable of detecting vehicles in one or more approaches to the intersection, such as vehicles arriving at the intersection. For example, a detection loop may be a pressure sensor embedded in the roadway.

In some embodiments, the vehicle transportation network intersection may include a detector, or multiple detectors, for detecting vehicles in multiple locations within an approach. For example, a lane of an approach of an intersection may include multiple detectors. In some embodiments, an approach, or a lane of an approach, may include a proximal loop detector proximate to the point of convergence of the approach to the intersection as shown at 6000, a distal loop detector geographically distant from the intersection, such as 100 meters or 300 meters from the intersection, as shown at 6100, an intermediate loop detector geographically between the proximal loop detector and the distal loop detector relative to the intersection as shown at 6200, or any combination thereof. Although three detectors are shown in each northbound lane in FIG. 6, any number of detectors may be used in an intersection. For example, a lane may include a single detector, or may include five detectors. In another example, each lane, or each approach, to the intersection may include one or more detectors.

Figure 7:
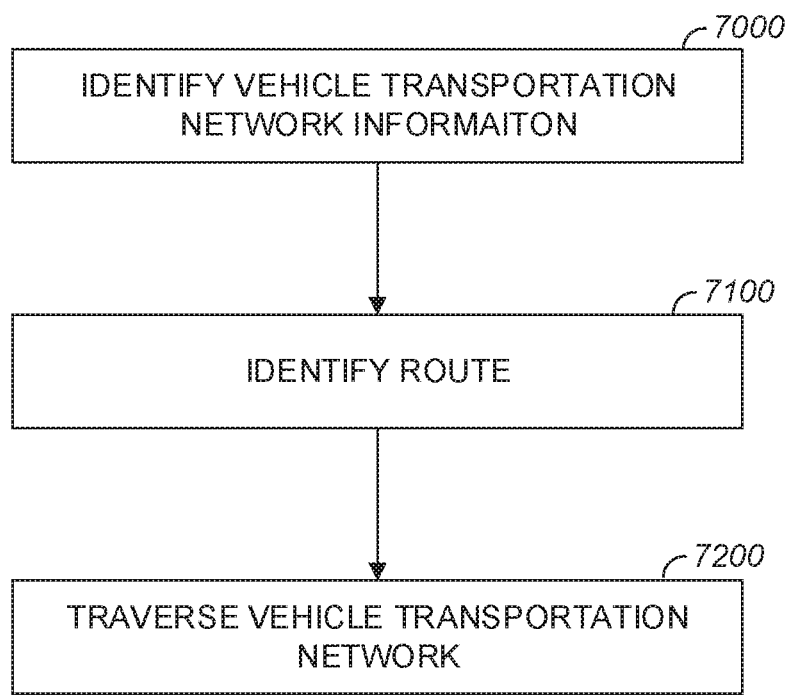
FIG. 7 is a diagram of an example of a method of traversing a vehicle transportation network using expected traffic control device state information in accordance with this disclosure.

FIG. 7 is a diagram of an example of a method of traversing a vehicle transportation network using expected traffic control device state information in accordance with this disclosure. In some embodiments, traversing a vehicle transportation network using expected traffic control device state information may be implemented in a vehicle, such as the vehicle 1000 shown in FIG. 1 or the vehicles 2100/2110 shown in FIG. 2.

In some embodiments, traversing a vehicle transportation network using expected traffic control device state information may include identifying vehicle transportation network information at 7000, identifying a route at 7100, traversing the vehicle transportation network at 7200, or a combination thereof.

In some embodiments, vehicle transportation network information may be identified at 7000. For example, a vehicle, such as the vehicle 1000 shown in FIG. 1 or the vehicles 2100/2110 shown in FIG. 2, may read the vehicle transportation network information from a data storage unit, such as the memory 1340 shown in FIG. 1, or may receive the vehicle transportation network information from an external data source, such as the communicating device 2400 shown in FIG. 2, via a communication system, such as the electronic communication network 2300 shown in FIG. 2. In some embodiments, identifying the vehicle transportation network information may include transcoding or reformatting the vehicle transportation network information, storing the reformatted vehicle transportation network information, or both.

In some embodiments, the vehicle transportation network information may include expected traffic control device state information. In some embodiments, the expected traffic control device state information may include, for example, a machine learning model, such as an artificial neural network model or a support vector regression model. In some embodiments, the model may be trained to determine an expected traffic control device state for one or more traffic control devices of an intersection of the vehicle transportation network. In some embodiments, the expected traffic control device state information may be information determined using an expected traffic control device state determination unit. For example, an expected traffic control device state determination unit may be implemented by a processor, such as the processor 1330 of the vehicle 1000 shown in FIG. 1, or a processor of an external device, such as the communicating device 2400 shown in FIG. 2. In some embodiments, the expected traffic control device state determination unit may implement a machine learning algorithm and may train the machine learning algorithm based on training data, such as shown in FIG. 8.

Figure 9:
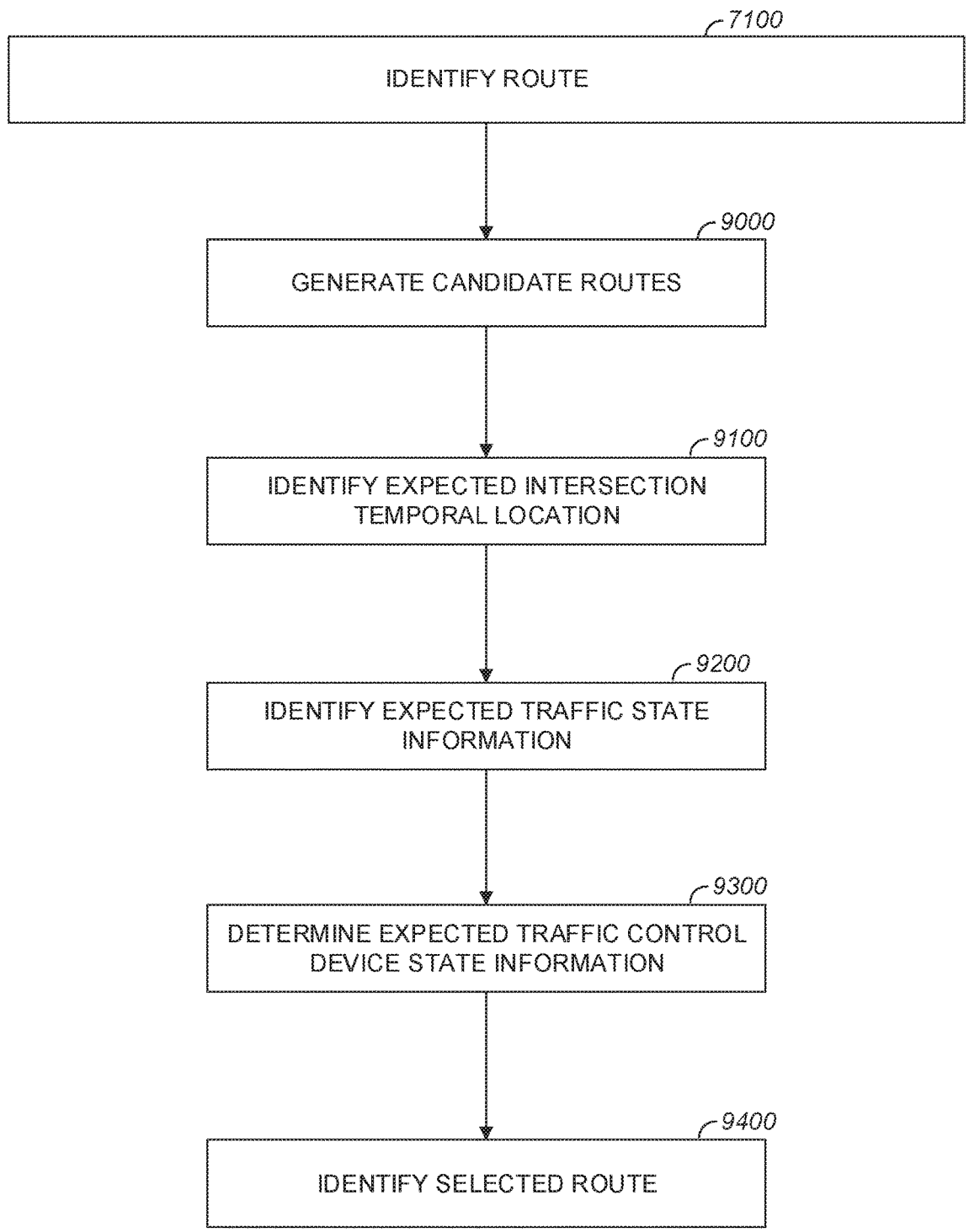
FIG. 9 is a diagram of an example of a method of identifying a route in accordance with this disclosure.

In some embodiments, as shown in FIG. 7, a route may be identified at 7100. In some embodiments, identifying a route at 7100 may include identifying an origin, such as a current geospatial and temporal location of the vehicle, a destination, which may be a geospatial location identified in the vehicle transportation network, or both. In some embodiments, a route from the origin to the destination in the vehicle transportation network may be identified at 7100 using the transportation network information identified at 7000. In some embodiments, the route may include a vehicle transportation network intersection, the expected traffic control device state information identified at 7000 may include expected traffic control device state information corresponding to the vehicle transportation network intersection, and identifying the route at 7100 may include using the expected traffic control device state information corresponding to the vehicle transportation network intersection identified at 7000, as shown in FIG. 9.

Figure 10:
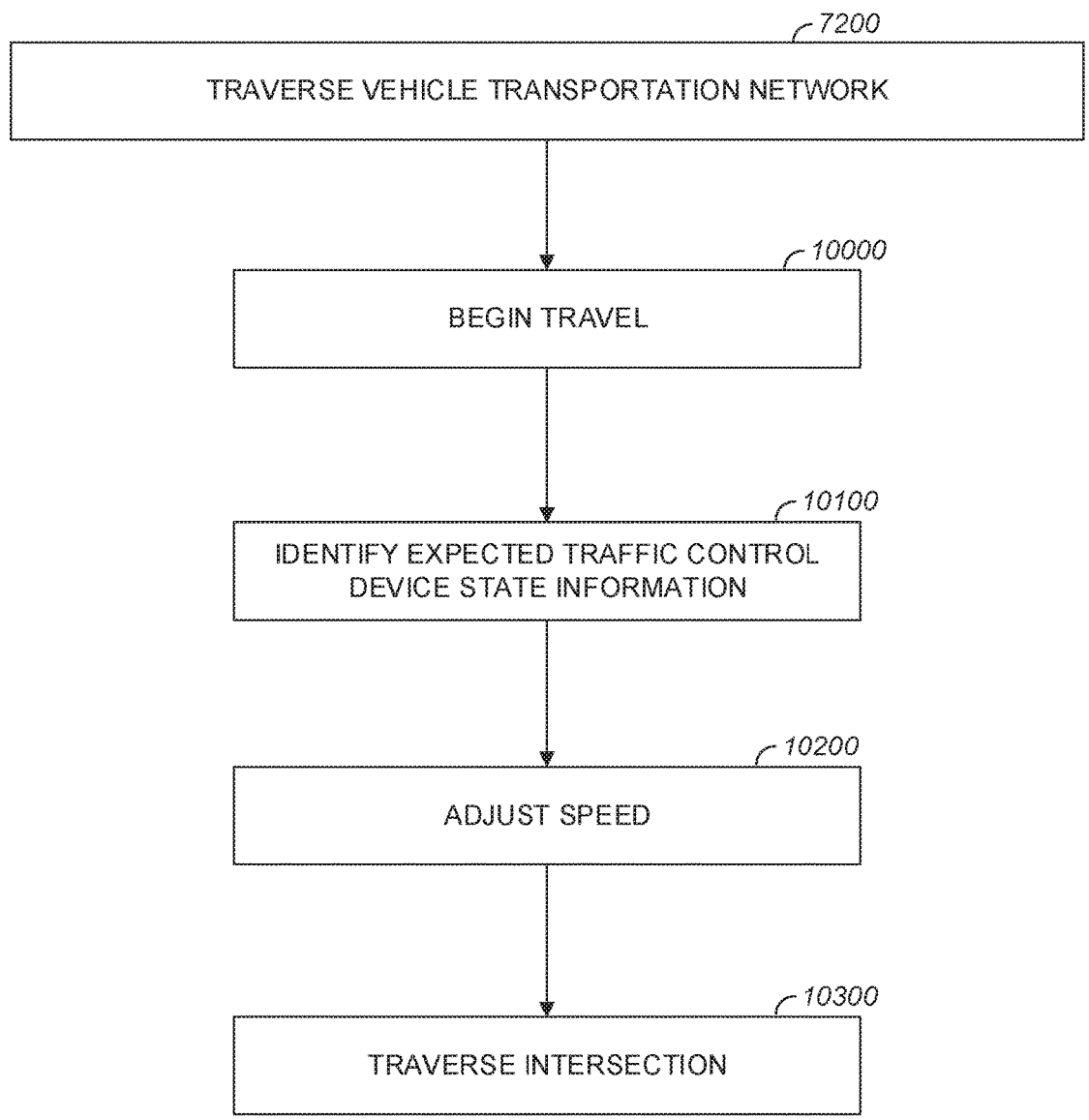
FIG. 10 is a diagram of an example of a method of traversing a route in accordance with this disclosure.

In some embodiments, as shown in FIG. 7, the vehicle may traverse the vehicle transportation network at 7200 using the route identified at 7100. For example, in some embodiments, the vehicle may be an autonomous vehicle and a trajectory controller, such as the trajectory controller 1300 shown in FIG. 1, may operate the vehicle to traverse the vehicle transportation network from the origin to the destination using the expected traffic control device state information identified at 7000, the route identified at 7100, or both, as shown in FIG. 10.

Figure 8:
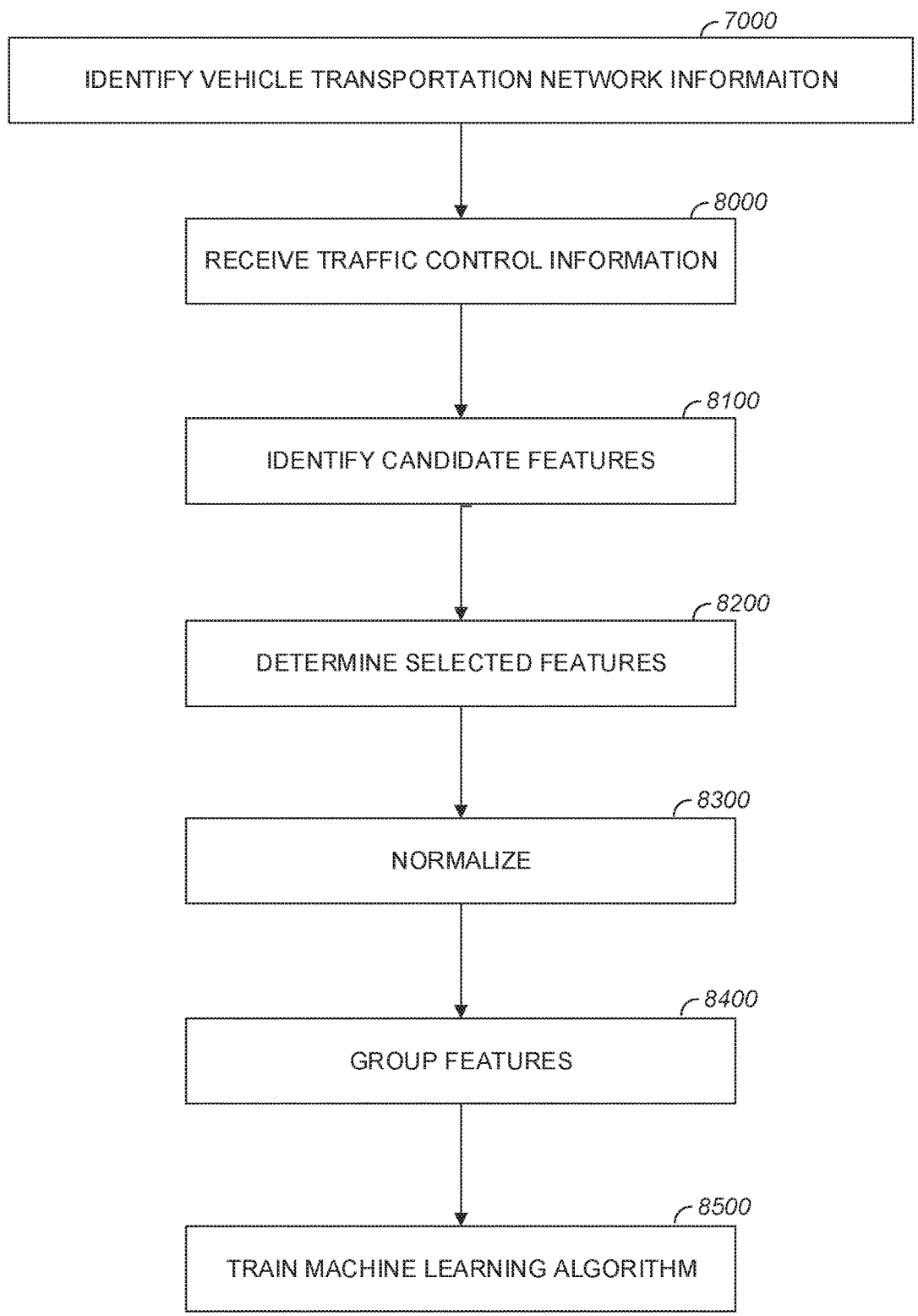
FIG. 8 is a diagram of an example of a method of identifying expected traffic control device state information in accordance with this disclosure.

FIG. 8 is a diagram of an example of a method of identifying expected traffic control device state information in accordance with this disclosure. In some embodiments, generating expected traffic control device state information may be implemented in a vehicle, such as the vehicle 1000 shown in FIG. 1 or the vehicles 2100/2110 shown in FIG. 2.

In some embodiments, identifying expected traffic control device state information at 7000 may include receiving traffic control information at 8000, identifying candidate features at 8100, determining selected features at 8200, normalizing training data at 8300, grouping features at 8400, or a combination thereof.

In some embodiments, traffic control information may be received at 8000. In some embodiments, infrastructure components of the vehicle transportation network corresponding to an intersection, such as a traffic control device controller, may generate and store traffic information corresponding to the intersection. In some embodiments, the traffic information may represent discrete events, such as the detection of a vehicle, or the changing of a phase, for the intersection. For example, the traffic control device controller may be a vehicle actuated traffic control device controller, and may generate and store traffic information corresponding to the traffic detected in and the operational control of the intersection.

In some embodiments, the traffic control information may be formatted as binary data. For example, the traffic information may include binary data representing detector loops, internal signal parameters, external signal parameters, speed detection, or any other information detected by or determined by the infrastructure components. In some embodiments, the traffic information may be recorded periodically, such as every 0.1 seconds, or at any other interval. Although the traffic control information is described herein as being formatted as binary data, the traffic control information may include data in any data format, or combination of formats.

In some embodiments, candidate features may be identified at 8100. For example, identifying candidate features at 8100 may include converting the binary formatted traffic control information representing discrete events into features that describe the operation of the traffic control device controller as continuous data, such as data including countdowns, timers, cumulative vehicle counts, or the like.

In some embodiments, identifying candidate features, or feature extraction, may include using defined initiation data, such as the traffic control information identified at 8000, and may include deriving features based on the initiation data. In some embodiments, the initiation data may include redundant or low value data. In some embodiments, identifying candidate features at 8100 may include extracting data from the initiation data that informative, non-redundant, and useful for training the machine learning algorithm to generate an efficient and effective model.

In some embodiments, the binary formatted traffic control information may include, for example, a matrix of data in which rows indicate time and columns represent information used as input or output of the controller. For example, the information at row i and column j may indicate the value of the control jth control parameter at the ith time. In some embodiments, the aggregation level, or interval, of time may be 1/10th of a second, which may correspond with the frequency at which the traffic control information is generated and stored.

In some embodiments, identifying candidate features at 8100 may include generating cumulative or aggregate information. For example, the vehicle control information may indicate whether a vehicle is detected during a discrete detection period, but may omit information indicating a cumulative or aggregate count of vehicles detected during an aggregate period, such as a during the duration of a phase or a cycle, and identifying candidate features at 8100 may include generating a cumulative or aggregate count of vehicles detected during an aggregate period, such as a during the duration of a phase or a cycle. In some embodiments, one or more features may be identified in response to input, such as user input indicating the features.

In some embodiments, a feature may represent the behavior of a signal group and may correspond to an event or an aggregation of events from the traffic information. In some embodiments, the features identified may include indexing features, detection features, external control state features, internal control state features, or any combination thereof.

An indexing feature may represent some or all of the signal groups for an intersection. For example, the traffic information may indicate a temporal location for corresponding information, which may include a date and a time, and the date may be identified as a feature representative of traffic information.

In some embodiments, detector features may be based on vehicle detection in one or more approaches of a signal group. In some embodiments, feature extraction may include identifying features based on the proximate loop detector and the distal loop detector traffic information. In some embodiments, detection features may include aggregate features, such as an aggregate count, or cardinality of the set, of vehicles detected in the approach at a discrete time, an aggregate count of vehicles detected in the approach during a discrete phase, or an aggregate count of vehicles detected in the approach during a consecutive sequence of cycles, such as five cycles, immediately preceding a discrete time.

In some embodiments, external control state features may describe control signal output of the controller. For example, the external control state features may represent proceed, or green, signal time periods, do-not-proceed, or red, signal time periods, or the like. In some embodiments, external control state features may represent external control state for a signal group at a discrete time, or during a consecutive sequence of cycles, such as five cycles, immediately preceding a discrete time. The external control state features may include, for example, timers, countdowns, proximal phase durations, or the like. A timer may represent an amount of time passed, or expired, for a current phase, which may be the phase corresponding to a discrete time. A countdown may indicate an expected remaining duration for a current phase. The proximal phase durations may represent the duration of the phases, such as the red phases and green phases, of a consecutive sequence of cycles, such as five cycles, immediately preceding a discrete time.

In some embodiments, internal control state features may represent control levels, such as a group completion control level or a signal group completion control level, within the controller. The group completion control level may correspond with the allocation of a green phase to a signal group. The Signal group completion control level may correspond with the duration of the current green phase. The internal control state features may include, for example, a timer indicating elapsed time of a current cycle relative to a signal group. In another example, the internal control state features may include an indication of a realization method, such as primary or alternative realization, for a green phase, which may include a timer, a countdown, and a defined temporal length, or duration, for each realization method.

In some embodiments, multiple features may be extracted per signal group. Features extracted may include elapsed permitted right-of-way signal temporal information, which may include an amount of time, such as a number of seconds, that has passed since the beginning of a green phase relative to time the information was generated. Features extracted may include elapsed signal phase temporal information, which may include an amount of time, such as a number of seconds, that has passed since the beginning of a signal phase current relative to time the information was generated. Features extracted may include elapsed cycle temporal information, which may include an amount of time, such as a number of seconds, that has passed since the beginning of a cycle current relative to time the information was generated. Features extracted may include a maximum lane-wise cardinality of detected vehicles corresponding to the elapsed permitted right-of-way signal temporal information, which may indicate a maximum count, or cardinality, of vehicles detected in a lane controlled by a green signal, relative to time the information was generated.

In some embodiments, features extracted may include permitted right-of-way signal durations associated with a current phase relative to time the information was generated. For example, the permitted right-of-way signal durations may correspond with a sequence of permitted right-of-way signals for the signal group preceding the current right-of-way signal for the signal group, such as the preceding five permitted right-of-way signals.

In some embodiments, features extracted may include prior maximum permitted lane-wise cardinalities. Each prior maximum permitted lane-wise cardinality may indicate a maximum permitted lane-wise cardinality of detected vehicles corresponding to a permitted right-of-way signal duration from sequence of permitted right-of-way signals preceding the current permitted right-of-way signal for the signal group relative to time the information was generated.

In some embodiments, features extracted may include denied right-of-way signal durations associated with a current phase relative to time the information was generated. For example, the denied right-of-way signal durations may correspond with a sequence of denied right-of-way for the signal group preceding the current right-of-way signal for the signal group, such as the preceding five denied right-of-way signals.

In some embodiments, features extracted may include prior maximum denied lane-wise cardinalities. Each prior maximum denied lane-wise cardinality may indicate a maximum denied lane-wise cardinality of detected vehicles corresponding to a denied right-of-way signal duration from sequence of denied right-of-way signals preceding the current denied right-of-way signal for the signal group relative to time the information was generated.

In some embodiments, features extracted may include a signal duration extension factor indicator indicating that a traffic control device right-of-way signal duration for a traffic control device from a first signal group, corresponding to the current right-of-way signal for the signal group, was extended in response to traffic control temporal information for a second signal group.

In some embodiments, an intersection may include G signal groups, such as ten signal groups (G=10), f features, such as 112 features (f=112), may be extracted per signal group, and 1120 features (10*112=1120) may be extracted for the intersection. For example, Table 1, below, shows an example of candidate features extracted from traffic control information.

TABLE 1

| INDEX | FEATURE NAME | DESCRIPTION |
|---|---|---|
| 1 | date | Date of the logged data in the dataset |
| 2 | index | Row index |
| 3 | X10th_sec | 1/10th of a second index, each row indicates 1/10 of a second |
| 4 | R_Time | Timer of current red signal |
| 5 | R_CD | Countdown of current red signal |
| 6 | R_Length | Absolute length in time of current red phase |
| 7 | R_Length1 | Absolute length in time of one red phase before current red phase |
| 8 | R_Length2 | Absolute length in time of the second red phase before current red phase |
| 9 | R_Length3 | Absolute length in time of the third red phase before current red phase |
| 10 | R_Length4 | Absolute length in time of the fourth red phase before current red phase |
| 11 | R_Length5 | Absolute length in time of the fifth red phase before current red phase |
| 12 | G_Time | Timer of current green signal |
| 13 | G_CD | Countdown of current green signal |
| 14 | G_Length | Absolute length in time of current green phase |
| 15 | G_Length1 | Absolute length in time of one green phase before current green phase |
| 16 | G_Length2 | Absolute length in time of the second green phase before current green phase |
| 17 | G_Length3 | Absolute length in time of the third green phase before current green phase |
| 18 | G_Length4 | Absolute length in time of the fourth green phase before current green phase |
| 19 | G_Length5 | Absolute length in time of the fifth green phase before current green phase |
| 20 | Y_Time | Timer of current yellow signal |
| 21 | Y_CD | Countdown of current yellow signal |
| 22 | Y_Length | Absolute length in time of current yellow phase |
| 23 | Block2Block_Time | Timer of current block and the corresponding block in the next cycle |
| 24 | Block2Block_CD | Countdown of current block and the corresponding block in the next cycle |
| 25 | Block2Block_Length | Absolute length in time of current block and the corresponding block in the next cycle |
| 26 | Block_Time | Timer of start to end of current block |
| 27 | Block_CD | Countdown of start to end of current block |
| 28 | Block_Length | Absolute length in time of start to end of current block |
| 29 | InterCycleTime_cnt | The summation of green phases of the signal groups of a cycle of the intersection. This variable gives the elapsed time within the summation of passed green phases |
| 30 | InterCycleTime_cnt1 | InterCycleTime_cnt of one cycle before current cycle |
| 31 | InterCycleTime_cnt2 | InterCycleTime_cnt of second cycle before current cycle |
| 32 | InterCycleTime_cnt3 | InterCycleTime_cnt of third cycle before current cycle |

TABLE 1-continued

| INDEX | FEATURE NAME | DESCRIPTION |
|---|---|---|
| 33 | InterCycleTime_cnt4 | InterCycleTime_cnt of fourth cycle before current cycle |
| 34 | InterCycleTime_cnt5 | InterCycleTime_cnt of fifth cycle before current cycle |
| 35 | InterCycleNumb_cnt | Number of green phases that are summed in InterCycleTime_cnt |
| 36 | InterCycleNumb_cnt1 | Number of green phases that are summed in InterCycleTime_cnt1 |
| 37 | InterCycleNumb_cnt2 | Number of green phases that are summed in InterCycleTime_cnt2 |
| 38 | InterCycleNumb_cnt3 | Number of green phases that are summed in InterCycleTime_cnt3 |
| 39 | InterCycleNumb_cnt4 | Number of green phases that are summed in InterCycleTime_cnt4 |
| 40 | InterCycleNumb_cnt5 | Number of green phases that are summed in InterCycleTime_cnt5 |
| 41 | SCycle_Time | Timer of the start to end of cycle of that particular signal group |
| 42 | SCycle_CD | Countdown of the start to end of cycle of that particular signal group |
| 43 | SCycle_Length | Absolute length in time of the start to end of cycle of that particular signal group |
| 44 | AR_Value | Binary indication of alternative realization |
| 45 | AR_Time | Timer if AR_Value == 1 |
| 46 | AR_CD | Countdown if AR_Value == 1 |
| 47 | AR_Length | Absolute length in time of alternative realization from start to end if AR_Value == 1 |
| 48 | Aan_Active | Binary indication of 'aanvraag' request parameter |
| 49 | Aan_Time | Timer if Aan_Active == 1 |
| 50 | Aan_CD | Countdown if Aan_Active == 1 |
| 51 | Aan_Length | Absolute length in time of request parameter from start to end if AR_Value == 1 |
| 52 | CG_Value | Categorical value of CG value (realization method) |
| 53 | RA_Active | Binary indication of 'red before green' parameter |
| 54 | RA_Time | Timer if RA_Active == 1 |
| 55 | RA_CD | Countdown if RA_Active == 1 |
| 56 | RA_Length | Absolute length in time of start to end of RA_active parameter if FG_Active == 1 |
| 57 | FG_Active | Binary indication when fixed green is active |
| 58 | FG_Time | Timer if FG_Active == 1 |
| 59 | FG_CD | Countdown if FG_Active == 1 |
| 60 | FG_Length | Absolute length in time of start to end of FG_active parameter is FG_active == 1 |
| 61 | WG_Active | Binary indication when waiting green is active |
| 62 | WG_Time | Timer if WG_Active == 1 |
| 63 | WG_CD | Countdown if WG_Active == 1 |
| 64 | WG_Length | Absolute length in time of start to end of WG_active parameter is WG_active == 1 |
| 65 | VG_Active | Binary indication when extending green is active |
| 66 | VG_Time | Timer if VG_Active == 1 |
| 67 | VG_CD | Countdown if VG_Active == 1 |
| 68 | VG_Length | Absolute length in time of start to end of VG_active parameter is VG_active == 1 |
| 69 | MG_Active | Binary indication when prolonging green is active |
| 70 | MG_Time | Timer if MG_Active == 1 |
| 71 | MG_CD | Countdown if MG_Active == 1 |
| 72 | MG_Length | Absolute length in time of start to end of MG_active parameter is MG_active == 1 |
| 73 | RV_Active | Binary indication of red before request parameter |
| 74 | RV_Time | Timer if RV_Active == 1 |
| 75 | RV_CD | Countdown if RV_Active == 1 |

TABLE 1-continued

| INDEX | FEATURE NAME | DESCRIPTION |
|---|---|---|
| 76 | RV_Length | Absolute length in time of start to end of RV_active parameter is RV_active == 1 |
| 77 | AtTdet1_MaxVol | Cumulative vehicle count at the first detector loop at current time |
| 78 | RDet1_MaxVol | Cumulative vehicle count at the first detector loop at current time when output signal is red |
| 79 | RDet1_MaxVol1 | RDet1_MaxVol of one cycle before current cycle |
| 80 | RDet1_MaxVol2 | RDet1_MaxVol of second cycle before current cycle |
| 81 | RDet1_MaxVol3 | RDet1_MaxVol of third cycle before current cycle |
| 82 | RDet1_MaxVol4 | RDet1_MaxVol of fourth cycle before current cycle |
| 83 | RDet1_MaxVol5 | RDet1_MaxVol of fifth cycle before current cycle |
| 84 | GDet1_MaxVol | Cumulative vehicle count at the first detector loop at current time when output signal is green |
| 85 | GDet1_MaxVol1 | GDet1_MaxVol of one cycle before current cycle |
| 86 | GDet1_MaxVol2 | GDet1_MaxVol of second cycle before current cycle |
| 87 | GDet1_MaxVol3 | GDet1_MaxVol of third cycle before current cycle |
| 88 | GDet1_MaxVol4 | GDet1_MaxVol of fourth cycle before current cycle |
| 89 | GDet1_MaxVol5 | GDet1_MaxVol of fifth cycle before current cycle |
| 90 | YDet1_MaxVol | Cumulative vehicle count at the first detector loop at current time when output signal is yellow |
| 91 | YDet1_MaxVol1 | YDet1_MaxVol of one cycle before current cycle |
| 92 | YDet1_MaxVol2 | YDet1_MaxVol of second cycle before current cycle |
| 93 | YDet1_MaxVol3 | YDet1_MaxVol of third cycle before current cycle |
| 94 | YDet1_MaxVol4 | YDet1_MaxVol of fourth cycle before current cycle |
| 95 | YDet1_MaxVol5 | YDet1_MaxVol of fifth cycle before current cycle |
| 96 | AtTdet3_MaxVol | Cumulative vehicle count at the third detector loop at current time |
| 97 | RDet3_MaxVol | Cumulative vehicle count at the third detector loop at current time when output signal is red |
| 98 | RDet3_MaxVol1 | RDet3_MaxVol of one cycle before current cycle |
| 99 | RDet3_MaxVol2 | RDet3_MaxVol of second cycle before current cycle |
| 100 | RDet3_MaxVol3 | RDet3_MaxVol of third cycle before current cycle |
| 101 | RDet3_MaxVol4 | RDet3_MaxVol of fourth cycle before current cycle |
| 102 | RDet3_MaxVol5 | RDet3_MaxVol of fifth cycle before current cycle |
| 103 | GDet3_MaxVol | Cumulative vehicle count at the third detector loop at current time when output signal is green |
| 104 | GDet3_MaxVol1 | GDet3_MaxVol of one cycle before current cycle |
| 105 | GDet3_MaxVol2 | GDet3_MaxVol of second cycle before current cycle |
| 106 | GDet3_MaxVol3 | GDet3_MaxVol of third cycle before current cycle |
| 107 | GDet3_MaxVol4 | GDet3_MaxVol of fourth cycle before current cycle |
| 108 | GDet3_MaxVol5 | GDet3_MaxVol of fifth cycle before current cycle |
| 109 | YDet3_MaxVol | Cumulative vehicle count at the third detector loop at current time when output signal is yellow |
| 110 | YDet3_MaxVol1 | YDet3_MaxVol of one cycle before current cycle |
| 111 | YDet3_MaxVol2 | YDet3_MaxVol of second cycle before current cycle |
| 112 | YDet3_MaxVol3 | YDet3_MaxVol of third cycle before current cycle |
| 113 | YDet3_MaxVol4 | YDet3_MaxVol of fourth cycle before current cycle |
| 114 | YDet3_MaxVol5 | YDet3_MaxVol of fifth cycle before current cycle |

In some embodiments, the features for a signal group, for a discrete time period, such as one day, may be stored in a discrete file, such as a comma separated variable (CSV) file. In some embodiments, the features may be extracted periodically, such as at 0.1 second intervals, and the extracted features for a signal group for a day may include a matrix having columns representing features ($Feature_f$) and rows representing time ($T_j$). In an example, the matrix for ten signal groups (G=10), 112 features (f=112), and a two hour time period, which may include 72000 rows (2*60*60*10=72000), may be expressed as the following:

$$\begin{bmatrix} T_1\_Feature_1 & \ldots & T_1\_Feature_{112} \\ \vdots & \ddots & \vdots \\ T_{72000}\_Feature_1 & \ldots & T_{72000}\_Feature_{112} \end{bmatrix}.$$

In some embodiments, the features per signal group per time period, such as one day, may be column-wise binded, or concatenated, over the signal groups of the intersection, which may be expressed as follows:

$$\begin{bmatrix} T_1\_Feature_1\_SignalGroup1 & \ldots & T_1\_Feature_{112}\_SignalGroup11 \\ \vdots & \ddots & \vdots \\ T_{72000}\_Feature_1\_SignalGroup1 & \ldots & T_{72000}\_Feature_{112}\_SignalGroup11 \end{bmatrix}.$$

In some embodiments, the column-wise binded features for the signal groups of an intersection per time period, such as one day, may be row-wise binded over multiple periods, such as the days of a month, or 30 consecutive days, which may be expressed as follows:

$$\begin{bmatrix} Day1\_T_1\_Feature_1\_SignalGroup1 & \ldots & Day1\_T_1\_Feature_{112}\_SignalGroup11 \\ \vdots & \ddots & \vdots \\ Day30\_T_{72000}\_Feature_1\_SignalGroup1 & \ldots & Day30\_T_{72000}\_Feature_{112}\_SignalGroup11 \end{bmatrix}.$$

In some embodiments, identifying the candidate features at 8100 may include validating the extracted features to omit data based on inaccurate information, such as information generated by faulty detectors. In some embodiments, the traffic information reported by and used by the controller may include inaccurate, false, or misleading information. For example, a faulty detector may inaccurately report a detected vehicle (false positive), and the controller may direct the flow of traffic through the intersection based on the inaccurate data, treating the false positives as accurate data.

In some embodiments, validating the extracted features may include identifying defined target features as quality indicators, data segmentation, identifying defined temporal contexts, identifying highly variant data, or a combination thereof.

In some embodiments, defined target, or key, features may be identified as quality indicators based on one or more statistical metrics. One or more defined target features may be identified based on each statistical metric. For example, a correlation statistical metric may be identified based on a cumulative count of vehicles detected by a defined detector, such as the detector proximate to the intersection, for an approach and the duration of the corresponding green phase. Based on the correlation statistical metric a maximum cardinality, or volume, of vehicles per lane may be identified as a defined target feature, and a green phase duration may be identified as a target feature. In another example, an arithmetic mean statistical metric, a maximum value statistical metric, a standard deviation statistical metric, or a combination thereof, may be identified based on a cumulative count of vehicles detected by a defined detector, such as the detector proximate to the intersection, for an approach. Based on one or more of these statistical metrics a maximum cardinality, or volume, of vehicles per lane may be identified as a defined target feature. In another example, an arithmetic mean statistical metric, a maximum value statistical metric, a standard deviation statistical metric, or a combination thereof, may be identified based on the green phase duration for an approach. Based on one or more of these statistical metrics a green phase duration may be identified as a defined target feature. In another example, a maximum number of green phases during a defined period may be identified as a defined target feature. In another example, an arithmetic mean statistical metric may be identified based a temporal length between the beginning of a phase and the subsequent beginning of the phase for a dominant signal group. Based on this metric, a signal cycle duration may be identified as a defined target feature.

In some embodiments, data segmentation may include identifying abnormal patterns in the data. Data segmentation may include evaluating the data corresponding to each defined temporal period independently. For example, the data may be evaluated on a day by day basis or the day by day data during a defined period of each day, such as 7:00 a.m. to 9:00 a.m.

In some embodiments, defined temporal contexts may be identified. In some embodiments, identifying defined temporal contexts may include temporally grouping feature values. In some embodiments, highly variant data, or outliers, may be identified. In some embodiments, identifying outliers may include identifying one or more expected, or normal, values or value ranges for respective features, such as values corresponding to a stable arithmetic means for the feature. In some embodiments, the expected values may be identified based on the defined temporal contexts. For example, for a feature an expected value may be identified for a weekday rush time period and another expected value may be identified for a corresponding time period of a weekend. In some embodiments, identifying outliers may include identifying values exceeding a defined threshold, such as a confidence interval or range around an identified expected value for the feature, identifying corresponding standard deviations, and identifying a correlation for a corresponding defined temporal context or identified standard pattern, such as weekend and weekday, summer and winter, holiday and non-holiday, peak and non-peak, or the like.

In some embodiments, selected features may be identified at 8200. In some embodiments, the features may be selected based on thorough statistical analysis methods. In some embodiments, the feature selection may include selecting features that have the strongest relation with a target variable.

For example, selected features may be identified for a permitted, or green, right-of-way signal model, a denied, or red, right-of-way signal model, or both. In some embodiments, the features selected for a permitted right-of-way signal model may be based on features corresponding to the signal group associated with the corresponding permitted right-of-way signal, which may include internal signal states, output signal states, loop detector data, or a combination thereof. In some embodiments, the features selected for a permitted right-of-way signal model may be based on, or weighted to prioritize, features related to detecting vehicles, such as detector loop features. In some embodiments, the features selected for a denied right-of-way signal model may be based on features corresponding any or all of the signal groups of the intersection, which may include internal signal states, output signal states, loop detector data, or a combination thereof. In some embodiments, the features selected for a denied right-of-way signal model may be based on, or weighted to prioritize, features related to controller state, or internal, features.

In some embodiments, training data may be normalized, or scaled, at 8300. In some embodiments, normalizing, or scaling, the training data may reduce operational complexity. For example, a support vector regression model may include using a kernel, which may use a dot product, or inner product, of a vector of features, may include using a large feature space, and normalizing the training data may reduce operational complexity.

For example, a traffic control feature may indicate the elapsed permitted right-of-way signal temporal information current relative to time the information was generated, and the corresponding feature value may be divided by a defined maximum permitted right-of-way signal temporal value to generate a normalized value. In another example, the traffic control feature may indicate elapsed signal phase temporal information current relative to time the information was generated, and the corresponding feature value may be divided by a defined maximum permitted right-of-way signal temporal value to generate a normalized value. In another example, the traffic control feature may indicate elapsed cycle temporal information current relative to time the information was generated, and the corresponding feature value may be divided by a defined maximum permitted right-of-way signal temporal value to generate a normalized value. In another example, the traffic control feature may indicate a permitted right-of-way signal duration associated with the elapsed permitted right-of-way signal temporal information current relative to time the information was generated, and the corresponding feature value may be divided by a defined maximum permitted right-of-way signal temporal value to generate a normalized value. In another example, the traffic control feature may indicate a denied right-of-way signal duration associated with the elapsed permitted right-of-way signal temporal information current relative to time the information was generated, and the corresponding feature value may be divided by a defined maximum denied right-of-way signal temporal value to generate a normalized value. In another example, the traffic control feature may indicate a maximum lane-wise cardinality of detected vehicles corresponding to the elapsed permitted right-of-way signal temporal information current relative to time the information was generated, and the corresponding feature value may be divided by a defined lane-wise maximum capacity to generate a normalized value. In another example, the traffic control feature may indicate a prior maximum permitted lane-wise cardinality current relative to time the information was generated, and the corresponding feature value may be divided by a defined lane-wise maximum capacity to generate a normalized value. In another example, the traffic control feature may indicate a prior maximum denied lane-wise cardinality current relative to time the information was generated, and the corresponding feature value may be divided by a defined lane-wise maximum capacity to generate a normalized value.

In some embodiments, the data may be normalized to a [0,1] scale. In some embodiments, normalization may include unity-based normalization, which may be expressed as the following:

$$X' = \frac{X - X_{min}}{X_{max} - X_{min}}.$$

In some embodiments, a standard score of a feature vector may be used for scaling. In some embodiments, the standard score may include using a mean $\mu$ of the respective plurality of selected traffic control feature values, a standard deviation $\sigma$ of the respective plurality of selected traffic control feature values, or both, which may be expressed as the following:

$$X' = \frac{X - \mu}{\sigma}.$$

In some embodiments, normalizing may include setting a restriction on how scaling is applied on the total dataset versus a small subset. In some embodiments, a feature vector of the total dataset may be referred to as the population.

In some embodiments, features may be grouped at 8400. For example, the normalized selected features may be grouped temporally, such as in hourly periods, daily periods, or by weekday and weekend groups. For example, the normalized traffic control feature values of selected traffic control features that correspond temporally with a defined temporal location, such as defined period of each day, such as 7:00 a.m. to 9:00 a.m. from each day of a five day period may be identified.

In some embodiments, data, such as the selected normalized data, may be used to train a machine learning algorithm, such as an artificial neural network or a support vector regression algorithm, at 8500. Training a machine learning algorithm may include creating or training a model, which may include classifying, or categorizing, elements from the training data. Each of the features selected at 8200 may be a dimension used for training the model. In some embodiments, the machine learning model may be an artificial neural network model or a support vector regression model. In some embodiments, the model may be trained to determine an expected traffic control device state for one or more traffic control devices of an intersection of the vehicle transportation network.

In some embodiments, training an artificial neural network model may include training a permitted, or green, right-of-way signal model, which may be used to determine a remaining duration, or countdown, for a current permitted, or green, right-of-way signal. In some embodiments, training a support vector regression model may include training a permitted, or green, right-of-way signal model, a denied right-of-way signal model, or both. A denied right-of-way signal model may be used to determine a remaining duration, or countdown, for a current denied, or red, right-of-way signal. In some embodiments, training a support vector regression model may include selecting one or more kernels, such as a polynomial kernel, a laplace kernel, or both.

FIG. 9 is a diagram of an example of a method of identifying a route in accordance with this disclosure. In some embodiments, identifying a route may be implemented in a vehicle, such as the vehicle 1000 shown in FIG. 1 or the vehicles 2100/2110 shown in FIG. 2, which may be an autonomous vehicle.

In some embodiments, identifying a route at 7100 may include generating one or more candidate routes at 9000, identifying an expected intersection temporal location at 9100, identifying expected traffic state information at 9200, determining expected traffic control device state information at 9300, identifying a selected route at 9400, or a combination thereof.

In some embodiments, one or more candidate routes from an origin to a destination in the vehicle transportation network may be generated at 9000. For example, the candidate routes may be identified based on vehicle transportation network information, such as the vehicle transportation network information identified as shown at 7000 in FIG. 7.

In some embodiments, one or more of the candidate routes may include a vehicle transportation network intersection. In some embodiments, the vehicle transportation network information may include expected traffic control device state information, such as expected traffic control device state information corresponding to the vehicle transportation network intersection. For example, the expected traffic control device state information corresponding to the vehicle transportation network intersection may include information representing a trained model corresponding to the vehicle transportation network intersection.

In some embodiments, an expected intersection temporal location of the vehicle transportation network intersection may be identified at 9100. For example, a candidate route may include an approach for the vehicle transportation network intersection controlled by a vehicle transportation network traffic control device and the expected intersection temporal location of the vehicle transportation network intersection may be an expected, or predicted, time, or time period, for the vehicle to traverse the approach.

In some embodiments, expected traffic state information may be identified at 9200. For example, expected traffic state information for the vehicle transportation network intersection may be identified. The expected traffic state information may indicate an expected, or predicted, count or cardinality of vehicles that may be in one or more approaches, such as the approach corresponding to a candidate route, to the vehicle transportation network intersection in a defined time period corresponding to the expected intersection temporal location identified at 9100.

In some embodiments, expected traffic control device state information may be determined at 9300. For example the expected traffic control device state information may indicate the expected, or predicted, state of a traffic control device, such as a traffic control device of an intersection along a candidate route. In some embodiments, the expected traffic control device state information may be identified based on the expected intersection temporal location identified at 9100, the expected traffic state information identified at 9200, or a combination thereof.

In some embodiments, the expected traffic control device state information may indicate expected permitted right-of-way signal temporal information corresponding to the vehicle transportation network intersection for the route. For example, the expected traffic control device state information may indicate that the traffic control device is expected to signal a permitted right-of-way signal concurrent with the expected intersection temporal location. In some embodiments, the expected intersection temporal location, the expected traffic state information, or both, may be provided as input to the model trained for the traffic control device, and the model may generate, or predict, the expected traffic control device state information.

In some embodiments, a selected route may be identified at 9400. For example, identifying the selected route may include selecting a candidate route from the candidate routes identified at 9000. In some embodiments, a candidate route may be selected as the selected route based on one or more operational cost metrics for traversing the vehicle transportation network from the origin, or current location of the vehicle, to the destination via the vehicle transportation network intersection using the route, such as a passenger safety risk metric, a route duration metric, or a fuel consumption metric. For example, based on the expected traffic state information identified at 9200 for the intersection at the expected intersection temporal location identified at 9100 for traversing an approach to the intersection via the route the machine learning model trained for the intersection may indicate that the traffic control device for the approach will signal a denied traffic control signal at the expected intersection temporal location, which may result in an increased route duration, and another candidate route, having a lower route duration may be selected.

FIG. 10 is a diagram of an example of a method of traversing a route in accordance with this disclosure. In some embodiments, traversing a route may be implemented in a vehicle, such as the vehicle 1000 shown in FIG. 1 or the vehicles 2100/2110 shown in FIG. 2. In some embodiments, traversing a route at 7200 may include beginning travel at 10000, identifying expected traffic control device state information at 10100, adjusting a speed at 10200, traversing an intersection at 10300, or a combination thereof.

In some embodiments, travel at may begin at 10000. For example, a vehicle may begin traversing the vehicle transportation network from an origin to a destination via a route, such as the route selected as shown at 7100 in FIG. 7. In some embodiments, the vehicle may be an autonomous vehicle and a trajectory controller of the vehicle may operate the vehicle to traverse the route.

In some embodiments, expected traffic control device state information may be identified at 10100. For example, a current, or expected, route for the vehicle may include a vehicle transportation network intersection. In some embodiments, the vehicle transportation network information may include expected traffic control device state information, such as expected traffic control device state information corresponding to the vehicle transportation network intersection. For example, the expected traffic control device state information corresponding to the vehicle transportation network intersection may include information representing a trained model corresponding to the vehicle transportation network intersection.

In some embodiments, identifying the expected traffic control device state information at 10100 may include identifying an expected intersection temporal location of the vehicle transportation network intersection, which may be similar to identifying an expected intersection temporal location of the vehicle transportation network intersection as shown at 9100 in FIG. 9. For example, the current route may include an approach for the vehicle transportation network intersection controlled by a vehicle transportation network traffic control device and the expected intersection temporal location of the vehicle transportation network intersection may be an expected, or predicted, time, or time period, for the vehicle to traverse the approach.

In some embodiments, identifying the expected traffic control device state information at 10100 may include identifying expected traffic state information, which may be similar to identifying expected traffic stat information as shown at 9200 in FIG. 9. For example, expected traffic state information for the vehicle transportation network intersection may indicate an expected, or predicted, count or cardinality of vehicles that may be in one or more approaches, such as the approach corresponding to the current route, to the vehicle transportation network intersection in a defined time period corresponding to the expected intersection temporal location for the vehicle to traverse the approach.

In some embodiments, the expected traffic control device state information may indicate the expected, or predicted, state of a traffic control device, such as a traffic control device of an intersection along the current route. In some embodiments, the expected traffic control device state information may be identified based on the expected intersection temporal location, the expected traffic state information identified, or a combination thereof.

In some embodiments, the expected intersection temporal location, the expected traffic state information, or both, may be provided as input to the model trained for the traffic control device, and the model may generate, or predict, the expected traffic control device state information. For example, the expected traffic control device state information may indicate that the traffic control device is expected to signal a permitted, or a denied, right-of-way signal concurrent with the expected intersection temporal location for the vehicle to traverse the approach, may indicate a time corresponding to the beginning of the signal period concurrent with the expected intersection temporal location for the vehicle to traverse the approach, may indicate an expected remaining duration for the signal period concurrent with the expected intersection temporal location for the vehicle to traverse the approach, or a combination thereof.

In some embodiments, a speed may be adjusted at 10200. For example, the expected traffic control device state information may indicate that the traffic control device is expected to signal a denied right-of-way signal concurrent with the expected intersection temporal location for the vehicle to traverse the approach, may indicate that the remaining expected duration of the denied right-of-way signal is expected to expire shortly after the current expected intersection temporal location for the vehicle to traverse the approach, the vehicle may reduce speed slightly, such as by five miles per hour, prior to traversing the approach, and expected intersection temporal location for the vehicle to traverse the approach may be delayed to correspond with a permitted right-of-way signal, without requiring the vehicle to stop at the denied right-of-way signal, which may minimize an expected operational cost metric, such as a route duration metric, a fuel consumption metric, or a combination thereof. In some embodiments, the vehicle may traverse the intersection at 10300.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A vehicle comprising:
a processor configured to execute instructions stored on a non-transitory computer readable medium to:
identify transportation network information representing a vehicle transportation network, the vehicle transportation network including a primary destination, wherein identifying the transportation network information includes identifying the transportation network information such that the transportation network information includes expected traffic control device state information, wherein the expected traffic control device state information is determined using an expected traffic control device state determination unit, wherein the expected traffic control device state determination unit implements a machine learning algorithm to determine the expected traffic control device state information, wherein the machine learning algorithm includes an artificial neural network algorithm trained using a plurality of selected traffic control features identified based on traffic control information for a traffic control device controller associated with a vehicle transportation network intersection, and
identify a route from an origin to the primary destination in the vehicle transportation network using the transportation network information, wherein the route includes the vehicle transportation network intersection, and wherein the expected traffic control device state information includes expected traffic control device state information corresponding to the vehicle transportation network intersection, and wherein using the transportation network information includes using the expected traffic control device state information corresponding to the vehicle transportation network intersection; and
a trajectory controller configured to operate the vehicle to traverse the vehicle transportation network from the origin to the primary destination using the route.

2. The vehicle of claim 1, wherein the vehicle is an autonomous vehicle, and wherein the trajectory controller is configured to operate the vehicle to traverse the vehicle transportation network from the origin to the primary destination using the expected traffic control device state information corresponding to the vehicle transportation network intersection.

3. The vehicle of claim 2, wherein operating the vehicle to traverse the vehicle transportation network from the origin to the primary destination using the expected traffic control device state information corresponding to the vehicle transportation network intersection includes adjusting a speed of the vehicle in response to the expected traffic control device state information such that an expected operational cost metric for traversing the vehicle transportation network intersection is minimized.

4. The vehicle of claim 3, wherein expected operational cost metric includes at least one of a route duration metric or a fuel consumption metric.

5. The vehicle of claim 1, wherein the processor is configured to execute instructions stored on the non-transitory computer readable medium to identify the route by:
identifying an expected temporal location of the vehicle transportation network intersection relative to operating the vehicle to traverse the vehicle transportation network from the origin to the primary destination using the route;
identifying expected traffic state information for the vehicle transportation network intersection based on the expected temporal location;
determining the expected traffic control device state information corresponding to the vehicle transportation network intersection based on the expected temporal location and the expected traffic state information using the expected traffic control device state determination unit; and
identifying the route from a plurality of candidate routes such that an expected operational cost metric for traversing the vehicle transportation network from the origin to the primary destination using the route is minimized based on the expected traffic control device state information, and wherein expected operational cost metric includes at least one of a passenger safety risk metric, a route duration metric, or a fuel consumption metric.

6. The vehicle of claim 1, wherein the traffic control device controller associated with the vehicle transportation network intersection is a vehicle actuated traffic control device controller.

7. The vehicle of claim 1, wherein the processor is configured to execute instructions stored on the non-transitory computer readable medium to identify the transportation network information such that the expected traffic control device state information is determined by:
receiving traffic control information for the traffic control device controller associated with the vehicle transportation network intersection;
evaluating the traffic control information to identify a plurality of candidate traffic control features;
determining the plurality of selected traffic control features from the plurality of candidate traffic control features; and
training the expected traffic control device state determination unit corresponding to the vehicle transportation network intersection using the plurality of selected traffic control features.

8. The vehicle of claim 7, wherein the traffic control information for the traffic control device controller associated with the vehicle transportation network intersection includes traffic control information for a defined temporal period.

9. The vehicle of claim 8, wherein evaluating the traffic control information to identify the plurality of candidate traffic control features includes, for each candidate traffic control feature from the plurality of candidate traffic control features, determining a respective plurality of traffic control feature values, such that the plurality of traffic control feature values includes traffic control feature values determined according to a defined interval during the defined temporal period.

10. The vehicle of claim 9, wherein the defined temporal period is one week and the defined interval is one second.

11. The vehicle of claim 7, wherein the plurality of selected traffic control features includes at least one of:
elapsed permitted right-of-way signal temporal information;
elapsed signal phase temporal information;
elapsed cycle temporal information;
a maximum lane-wise cardinality of detected vehicles corresponding to the elapsed permitted right-of-way signal temporal information;
a plurality of permitted right-of-way signal durations associated with the elapsed permitted right-of-way signal temporal information, wherein each permitted right-of-way signal duration from the plurality of permitted right-of-way signal durations corresponds with a permitted right-of-way signal from a sequence of permitted right-of-way signals preceding a current permitted right-of-way signal;
a plurality of prior maximum permitted lane-wise cardinalities, wherein each prior maximum permitted lane-wise cardinality indicates a respective maximum permitted lane-wise cardinality of detected vehicles corresponding to a respective permitted right-of-way signal duration from the plurality of permitted right-of-way signal durations;
a plurality of denied right-of-way signal durations associated with the elapsed permitted right-of-way signal temporal information, wherein each denied right-of-way signal duration from the plurality of denied right-of-way signal durations corresponds with a denied right-of-way signal from a sequence of denied right-of-way signals preceding a current permitted right-of-way signal;
a plurality of prior maximum denied lane-wise cardinalities, wherein each prior maximum denied lane-wise cardinality indicates a respective maximum denied lane-wise cardinality of detected vehicles corresponding to a respective denied right-of-way signal duration from the plurality of denied right-of-way signal durations; or
a signal duration extension factor indicator indicating that a traffic control device right-of-way signal duration for a traffic control device from a first signal group, corresponding to the elapsed permitted right-of-way signal temporal information, was extended in response to traffic control temporal information for a second signal group.

12. The vehicle of claim 11, wherein the plurality of permitted right-of-way signal durations includes five permitted right-of-way signal durations and the plurality of denied right-of-way signal durations includes five denied right-of-way signal durations.

13. The vehicle of claim 11, wherein the processor is configured to execute instructions stored on the non-transitory computer readable medium to identify the transportation network information such that the expected traffic control device state information is determined by:
generating a plurality of normalized traffic control feature values by normalizing one or more traffic control feature values from the plurality of traffic control feature values.

14. The vehicle of claim 13, wherein normalizing one or more of the plurality of traffic control feature values includes generating a normalized traffic control feature value from the plurality of normalized traffic control feature values corresponding to the respective traffic control feature value by:
on a condition that the respective corresponding traffic control feature is the elapsed permitted right-of-way signal temporal information, dividing the respective traffic control feature value by a defined maximum permitted right-of-way signal temporal value;
on a condition that the respective corresponding traffic control feature is the elapsed signal phase temporal information, dividing the respective traffic control feature value by the defined maximum permitted right-of-way signal temporal value;
on a condition that the respective corresponding traffic control feature is the elapsed cycle temporal information, dividing the respective traffic control feature value by the defined maximum permitted right-of-way signal temporal value;
on a condition that the respective corresponding traffic control feature is a permitted right-of-way signal duration from the plurality of permitted right-of-way signal durations associated with the elapsed permitted right-of-way signal temporal information, dividing the respective traffic control feature value by the defined maximum permitted right-of-way signal temporal value;
on a condition that the respective corresponding traffic control feature is a denied right-of-way signal duration from the plurality of denied right-of-way signal durations associated with the elapsed permitted right-of-way signal temporal information, dividing the respective traffic control feature value by a defined maximum denied right-of-way signal temporal value;
on a condition that the respective corresponding traffic control feature is the maximum lane-wise cardinality of detected vehicles corresponding to the elapsed permitted right-of-way signal temporal information, dividing the respective traffic control feature value by a defined lane-wise maximum capacity;
on a condition that the respective corresponding traffic control feature is a prior maximum permitted lane-wise cardinality from the plurality of prior maximum permitted lane-wise cardinalities, dividing the respective traffic control feature value by the defined lane-wise maximum capacity; and
on a condition that the respective corresponding traffic control feature is a prior maximum denied lane-wise cardinality from the plurality of prior maximum denied lane-wise cardinalities, dividing the respective traffic control feature value by the defined lane-wise maximum capacity.

15. The vehicle of claim 13, wherein the processor is configured to execute instructions stored on the non-transitory computer readable medium to identify the transportation network information such that the expected traffic control device state information is determined by:
identifying a selected traffic control feature group from the plurality of selected traffic control features, wherein the selected traffic control feature group includes selected traffic control features from the plurality of selected traffic control features that correspond temporally with a defined temporal location within the defined temporal period.

16. The vehicle of claim 15, wherein training the expected traffic control device state determination unit includes training the expected traffic control device state determination unit using the selected traffic control feature group and the corresponding plurality of normalized traffic control feature values.

17. The vehicle of claim 15, wherein identifying the selected traffic control feature group includes identifying a plurality of selected traffic control feature groups, wherein each selected traffic control feature group from the plurality of selected traffic control feature groups includes respective selected traffic control features from the plurality of selected traffic control features that correspond temporally with a respective defined temporal location from a plurality of defined temporal locations within the defined temporal period.

18. The vehicle of claim 17, wherein the expected traffic control device state determination unit includes a plurality of the group-wise expected traffic control device state determination units, wherein each group-wise expected traffic control device state determination unit from the plurality of group-wise expected traffic control device state determination units corresponds with a respective selected traffic control feature group from the plurality of selected traffic control feature groups and wherein training the expected traffic control device state determination unit includes training each group-wise expected traffic control device state determination unit from the plurality of group-wise expected traffic control device state determination units using the respective corresponding selected traffic control feature group and the respective corresponding plurality of normalized traffic control feature values.

19. An autonomous vehicle comprising:
a processor configured to execute instructions stored on a non-transitory computer readable medium to:
identify transportation network information representing a vehicle transportation network, the vehicle transportation network including a primary destination, wherein identifying the transportation network information includes identifying the transportation network information such that the transportation network information includes expected traffic control device state information, wherein the expected traffic control device state information is determined using an expected traffic control device state determination unit, wherein the expected traffic control device state determination unit implements a machine learning algorithm to determine the expected traffic control device state information, wherein the machine learning algorithm includes an artificial neural network algorithm trained using a plurality of selected traffic control features identified based on traffic control information for a traffic control device controller associated with a vehicle transportation network intersection, and
identify a route from an origin to the primary destination in the vehicle transportation network using the transportation network information, wherein the route includes the vehicle transportation network intersection, and wherein the expected traffic control device state information includes expected traffic control device state information corresponding to the vehicle transportation network intersection, and wherein using the transportation network information includes using the expected traffic control device state information corresponding to the vehicle transportation network intersection; and
a trajectory controller configured to operate the autonomous vehicle to traverse the vehicle transportation network from the origin to the primary destination using the route using the expected traffic control device state information corresponding to the vehicle transportation network intersection.

20. The autonomous vehicle of claim 19, wherein operating the autonomous vehicle to traverse the vehicle transportation network from the origin to the primary destination using the expected traffic control device state information corresponding to the vehicle transportation network intersection includes adjusting a speed of the autonomous vehicle in response to the expected traffic control device state information such that an expected operational cost metric for traversing the vehicle transportation network intersection is minimized, and wherein the expected operational cost metric includes at least one of a route duration metric or a fuel consumption metric.

21. The autonomous vehicle of claim 19, wherein the processor is configured to execute instructions stored on the non-transitory computer readable medium to identify the route by:
identifying an expected temporal location of the vehicle transportation network intersection relative to operating the autonomous vehicle to traverse the vehicle transportation network from the origin to the primary destination using the route;
identifying expected traffic state information for the vehicle transportation network intersection based on the expected temporal location;
determining the expected traffic control device state information corresponding to the vehicle transportation network intersection based on the expected temporal location and the expected traffic state information using the expected traffic control device state determination unit; and
identifying the route from a plurality of candidate routes such that an expected operational cost metric for traversing the vehicle transportation network from the origin to the primary destination using the route is minimized based on the expected traffic control device state information.

22. The autonomous vehicle of claim 21, wherein expected operational cost metric includes at least one of a passenger safety risk metric, a route duration metric, or a fuel consumption metric.

23. A vehicle comprising:
a processor configured to execute instructions stored on a non-transitory computer readable medium to:
identify transportation network information representing a vehicle transportation network, the vehicle transportation network including a primary destination, wherein identifying the transportation network information includes identifying the transportation network information such that the transportation network information includes expected traffic control device state information, wherein the expected traffic control device state information is determined using an artificial neural network algorithm, such that the expected traffic control device state information is determined by:
receiving traffic control information for a vehicle actuated traffic control device controller associated with the vehicle transportation network intersection;
evaluating the traffic control information to identify a plurality of candidate traffic control features;
determining a plurality of selected traffic control features from the plurality of candidate traffic control features; and training the expected traffic control device state determination unit corresponding to the vehicle transportation network intersection using the plurality of selected traffic control features, and identify a route from an origin to the primary destination in the vehicle transportation network using the transportation network information, wherein the route includes a vehicle transportation network intersection, and wherein the expected traffic control device state information includes expected traffic control device state information corresponding to the vehicle transportation network intersection, and wherein using the transportation network information includes using the expected traffic control device state information corresponding to the vehicle transportation network intersection, wherein the expected traffic control device state information includes expected permitted right-of-way signal temporal information corresponding to the vehicle transportation network intersection for the route; and a trajectory controller configured to operate the vehicle to traverse the vehicle transportation network from the origin to the primary destination using the route.

24. The vehicle of claim 23, wherein the traffic control information for the traffic control device controller associated with the vehicle transportation network intersection includes traffic control information for a defined temporal period.

25. The vehicle of claim 24, wherein evaluating the traffic control information to identify the plurality of candidate traffic control features includes, for each candidate traffic control feature from the plurality of candidate traffic control features, determining a respective plurality of traffic control feature values, such that the plurality of traffic control feature values includes traffic control feature values determined according to a defined interval during the defined temporal period, and wherein the defined temporal period is one week and the defined interval is one second.

* * * * *